(12) United States Patent
Kataoka et al.

(10) Patent No.: US 8,688,932 B2
(45) Date of Patent: *Apr. 1, 2014

(54) VIRTUAL COMPUTER SYSTEM AND METHOD OF CONTROLLING THE SAME

(75) Inventors: Eri Kataoka, Tokyo (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,458

(22) Filed: Sep. 14, 2012

(65) Prior Publication Data

US 2013/0067166 A1 Mar. 14, 2013

(30) Foreign Application Priority Data

Oct. 25, 2007 (JP) ................................. 2007-277726

(51) Int. Cl.
*G06F 12/00* (2006.01)

(52) U.S. Cl.
USPC ............ 711/159; 711/112; 711/153; 711/170

(58) Field of Classification Search
None
See application file for complete search history.

(56) References Cited

U.S. PATENT DOCUMENTS

| 7,945,747 | B2 | 5/2011 | Kataoka et al. |
| 2005/0050342 | A1 | 3/2005 | Boivie et al. |
| 2006/0112342 | A1 | 5/2006 | Bantz et al. |
| 2006/0156058 | A1 | 7/2006 | Koga et al. |
| 2007/0038819 | A1* | 2/2007 | Miki et al. ..................... 711/154 |
| 2007/0233455 | A1 | 10/2007 | Zimmer et al. |
| 2007/0288712 | A1 | 12/2007 | Zimoto et al. |
| 2007/0294676 | A1 | 12/2007 | Mellor et al. |
| 2007/0300221 | A1 | 12/2007 | Hartz et al. |

FOREIGN PATENT DOCUMENTS

JP 2006-338201 12/2006

OTHER PUBLICATIONS

English translation of Japanese Notification of Reasons for Refusal dated Sep. 26, 2011, issued in corresponding Japanese Patent Application No. 2007-277726.

\* cited by examiner

*Primary Examiner* — Than Nguyen
(74) *Attorney, Agent, or Firm* — Brundidge & Stanger, P.C.

(57) ABSTRACT

In a virtual computer system controlling a disk volume and a virtual server which is connected to the disk volume, to which the area of the disk volume is allocated as a virtual disk and which executes a process using the allocated virtual disk, the virtual computer system erases information stored in the virtual disk allocated to the virtual server to be deleted correspondingly with the deletion of the virtual server. An administrative server may be provided to select a server system which is low in load from among plural server systems controlling virtual servers as a server system for erasing information stored in the virtual disk allocated to the virtual server to be deleted.

7 Claims, 28 Drawing Sheets

| PHYSICAL SERVER IDENTIFIER | CPU | MEMORY (GB) | DEVICE | CONNECTION DISK |
|---|---|---|---|---|
| SERVER 1 | 2GHz ×2 | 24 | NIC1:MAC1<br>NIC2:MAC2<br>HBA:WWN1 | DISK VOLUME 1 (300GB) |
| SERVER 2 | 2GHz ×1 | 16 | NIC1:MAC3<br>HBA:WWN2 | DISK VOLUME 2 (600GB) |
| SERVER 3 | 3GHz ×4 | 128 | NIC1:MAC4<br>NIC2:MAC5<br>HBA1:WWN3<br>HBA2:WWN4 | DISK VOLUME 3 (500GB)<br><br>DISK VOLUME 4 (1TB) |
| SERVER 4 | 3GHz ×2 | 64 | NIC1:MAC6<br>NIC2:MAC7<br>HBA1:WWN5<br>HBA2:WWN6 | DISK VOLUME 5 (2TB)<br><br>DISK VOLUME 6 (1TB) |

Columns: 701, 702, 703, 704, 705

| 801 | 802 | 803 | 804 | 805 |
|---|---|---|---|---|
| SERVER VIRTUALIZATION FACILITY IDENTIFIER | OPERATING PHYSICAL SERVER IDENTIFIER | VIRTUAL SERVER IDENTIFIER | ALLOCATION RESOURCE | STATUS |
| SERVER VIRTUALIZATION FACILITY 1 | SERVER 1 | VIRTUAL SERVER 1 | CPU: 1GHz × 1<br>MEMORY: 2GB<br>vNIC1: vMAC1<br>VIRTUAL DISK IDENTIFIER : VIRTUAL DISK 1 | UNDER OPERATION |
| SERVER VIRTUALIZATION FACILITY 2 | SERVER 2 | VIRTUAL SERVER 2 | CPU: 1GHz × 1<br>MEMORY: 1GB<br>vNIC1: vMAC2<br>VIRTUAL DISK IDENTIFIER : VIRTUAL DISK 2 | UNDER OPERATION |
| | | VIRTUAL SERVER 3 | CPU: 2GHz × 2<br>MEMORY: 8GB<br>vNIC1: vMAC3<br>VIRTUAL DISK IDENTIFIER : VIRTUAL DISK 3 | UNDER OPERATION |
| SERVER VIRTUALIZATION FACILITY 3 | SERVER 3 | VIRTUAL SERVER 4 | CPU: 3GHz × 1<br>MEMORY: 4GB<br>vNIC1: vMAC4<br>VIRTUAL DISK IDENTIFIER : VIRTUAL DISK 4 | NON OPERATION |
| | | VIRTUAL SERVER 5 | CPU: 2GHz × 1<br>MEMORY: 2GB<br>vNIC1: vMAC5<br>VIRTUAL DISK IDENTIFIER : VIRTUAL DISK 5 | UNDER OPERATION |

| SERVER VIRTUALIZATION FACILITY IDENTIFIER (901) | OPERATING PHYSICAL SERVER IDENTIFIER (902) | VIRTUAL SERVER IDENTIFIER (903) | CPU ALLOCATION (904) | PHUSICAL CPU UTILIZATION RATE (905) |
|---|---|---|---|---|
| SERVER VIRTUALIZATION FACILITY 1 | SERVER 1 | VIRTUAL SERVER 1 | 20 | 10% |
| | | VIRTUAL SERVER 2 | 30 | 20% |
| | | DISK ERASURE PROCESS | 7 | 10% |
| SERVER VIRTUALIZATION FACILITY 2 | SERVER 2 | VIRTUAL SERVER 3 | 30 | 20% |
| | | DISK ERASURE PROCESS | 10 | 30% |
| SERVER VIRTUALIZATION FACILITY 3 | SERVER 3 | VIRTUAL SERVER 4 | 50 | 40% |
| | | VIRTUAL SERVER 5 | 30 | 20% |

| 1001 | 1002 | 1003 | 1004 | 1005 | 1006 | 1007 |
|---|---|---|---|---|---|---|
| VIRTUAL DISK IDENTIFIER | DISK VOLUME | LOGIC BLOCK NUMBER | PHYSICAL BLOCK NUMBER | DIVISION FILE NAME | STATUS | PROCESS PHYSICAL SERVER IDENTIFIER |
| VIRTUAL DISK 1 | DISK VOLUME 1 | 1_BLOCK 00 | #11 - #20 | 1_FILE_01 | COMPLETION OF ERASURE | SERVER 1 |
| | | 1_BLOCK 01 | #21 - #30 | | | SERVER 1 |
| | | 1_BLOCK 02 | #31 - #40 | 1_FILE_02 | UNDER EXECUTION | SERVER 1 |
| | | 1_BLOCK 03 | #41 - #50 | | | SERVER 1 |
| VIRTUAL DISK 2 | DISK VOLUME 1 | 2_BLOCK 00 | #01 - #10 | 2_FILE_01 | COMPLETION OF ERASURE | SERVER 2 |
| | | 2_BLOCK 01 | #11 - #20 | | | SERVER 2 |
| | | 2_BLOCK 02 | #21 - #30 | | | SERVER 2 |
| | | 2_BLOCK 03 | #31 - #40 | | | SERVER 2 |
| | | 2_BLOCK 04 | #41 - #50 | 2_FILE_02 | UNDER EXECUTION | SERVER 2 |
| | | 2_BLOCK 05 | #51 - #60 | | | SERVER 2 |
| | | 2_BLOCK 06 | #61 - #70 | | | SERVER 2 |
| | | 2_BLOCK 07 | #71 - #80 | | | SERVER 2 |

| VIRTUAL DISK IDENTIFIER (1101) | LOGIC BLOCK NUMBER (1102) | PHYSICAL BLOCK NUMBER (1103) |
|---|---|---|
| VIRTUAL DISK 1 | #00 | #10 |
| | #01 | #11 |
| | #02 | #12 |
| | #03 | #13 |
| | #04 | #14 |
| | ... | ... |
| VIRTUAL DISK 5 | #00 | #51 |
| | #01 | #52 |
| | #02 | #53 |
| | #03 | #54 |
| | #04 | #55 |
| | ... | ... |

| UNUSED PHYSICAL BLOCK NUMBER |
|---|
| #00 - #09 |
| #20 - #50 |
| #60 - #156 |
| #210 - #512 |
| ... |

FIG.28

|  | CPU UTILIZATION RATE(%) | | | | |
| --- | --- | --- | --- | --- | --- |
|  | ~20 | ~40 | ~60 | ~80 | ~100 |
| RATIO OF UNUSED PHYSICAL BLOCK(%) ~20 | 10 | 9 | 8 | 7 | 6 |
| ~40 | 9 | 8 | 7 | 6 | 5 |
| ~60 | 8 | 7 | 6 | 5 | 4 |
| ~80 | 7 | 6 | 5 | 4 | 3 |
| ~100 | 6 | 5 | 4 | 3 | 2 |

FIG.29

|  | | CPU UTILIZATION RATE(%) | | | | |
|---|---|---|---|---|---|---|
|  | | ~20 | ~40 | ~60 | ~80 | ~100 |
| RATIO OF UNUSED AREA(%) | ~20 | 10 | 9 | 8 | 7 | 6 |
|  | ~40 | 9 | 8 | 7 | 6 | 5 |
|  | ~60 | 8 | 7 | 6 | 5 | 4 |
|  | ~80 | 7 | 6 | 5 | 4 | 3 |
|  | ~100 | 6 | 5 | 4 | 3 | 2 |

VIRTUAL COMPUTER SYSTEM AND METHOD OF CONTROLLING THE SAME

This application claims priority from Japanese Patent Application No. 2007-277726, filed Oct. 25, 2007 and is a continuation application of U.S. application Ser. No. 13/091,554, filed Apr. 21, 2011, which is a continuation application of U.S. application Ser. No. 12/031,157, filed Feb. 14, 2008, now U.S. Pat. No. 7,945,747, the entire disclosures of which are incorporated herein by reference.

BACKGROUND OF THE INVENTION

The present invention relates to a virtual computer system and a method of controlling the same, and in particular to, a system for improving the security of a virtual computer and a method of controlling the same.

DESCRIPTION OF THE RELATED ART

A disk unit (storage system) connected to a server system stores an operating system (OS), an application program and user data which operate on the server system. The storage capacity of the disk unit (storage system) has substantially increased particularly as in a Redundant Arrays of Inexpensive Disks (RAID) unit to enable storing of a large number of programs and data.

A substantial increase in the storage capacity of the disk unit becomes a factor which brings a security problem to the surface. That is to say, the risk increased that a large number of programs and data in the disk unit is read by an unauthorized third party. The disk unit is managed by a function generally referred to as file system of OS so as to easily execute the retention, addition and renewal of files such as a large number of programs and data.

Even if files are continuous for a user, the file system can be written in the discontinuous area in the disk unit. This provides the file system to effectively use the area in the disk unit and provides a user with easiness to use.

In the file system, the deletion of the file means that the disk area where files are stored is only released (not erased) to allocate other files and the stored programs and data are not erased. Therefore, even if files are deleted, from the standpoint of administration of the file system, the contents (programs and data) of the files are left in the disk unit. In this context, if the third party directly reads the contents in the disk unit not through the file system, there is a risk that the third party may access the contents of the deleted file.

To cope with such a problem, there is a function of erasing the contents in the disk unit to prevent the contents in the disk unit from being read by the third party. The function is generally used when a user finishes using a server system, for example, when a server system is scrapped and returned to a rental shop. Forcibly overwriting random data on all the contents in the disk unit erases information of programs and data (U.S. Patent Publication No. US20050050342). This prevents the contents of files such as user information from being read by the third party even if the third party gets the disk unit.

SUMMARY OF THE INVENTION

There exists a server virtualization technology generating plural virtual servers capable of independently operating OS on a server system (computer) as hardware. The server virtualization technology is such that the resources of the server system such as a processor, a memory and a disk unit (storage system) are divided and allocated to their respective virtual servers to attempt effective use of the resources. A server virtualization facility (software and/or hardware realizing the virtualization of servers) operating on the server system allocates resources and schedules virtual servers. The deletion and the generation of the virtual server are generally executed based upon instructions from an administrator of the server virtualization facility. The generation and the deletion of the virtual server are realized by securing and releasing resources.

The above conventional technology can erase programs and data in a disk unit in units of a server system as hardware.

It is not sufficient merely to erase information in units of a server system as in the above conventional technology so as to ensure the security of the disk unit in the environment of the virtual server. A major problem is to determine when data is erased. Since a virtual server is repetitively generated and deleted on the server system as hardware in the environment of the virtual server, plural the virtual servers resultantly shares the area of the disk unit (i.e., the disk area used by the deleted virtual server is allocated to a newly generated virtual server), which causes a problem in that a new virtual server reads the contents (information of programs and data) in the disk area which is released correspondingly with the deletion of the virtual server.

A collateral problem is that a load for erasing information is high, although information in the disk unit can be erased. The erasure of information in the disk unit is a process for continuously writing data meaningless for the third party, heightening a load of the processor of the server system and a load of the disk unit. In the environment of the virtual server, other virtual servers operate on the server system executing the process for erasing information in the disk unit, causing a problem in that the performances of the other virtual servers are lowered.

The present invention is realized by the following embodiments. In a virtual computer system for controlling a disk volume and a virtual server which is connected to the disk volume, to which the area of the disk volume is allocated as a virtual disk and which executes a process using the allocated virtual disk, the virtual computer system and a method of controlling the same erases information stored in the virtual disk allocated to the virtual server to be deleted.

According to another embodiment of the present invention, in a virtual computer system and a method of controlling the same, an administrative server is provided to select a server system which is low in load from among plural server systems controlling virtual servers as a server system for erasing information stored in the virtual disk allocated to the virtual server to be deleted.

According to the present invention, contents (or, information such as programs or data) in the virtual disk used by the virtual server can be erased in association with the deletion of the virtual server to allow the security of information to be ensured. According to another embodiment of the present invention, contents in the virtual disk can be erased by the server system whose load is low and the influence can be decreased of load of process for erasing contents in the virtual disk on other virtual servers.

BRIEF DESCRIPTION OF THE DRAWINGS

FIG. 7 is a table illustrating the configuration of the physical server administration table;

FIG. 8 is a table illustrating the configuration of the virtual server administration table;

FIG. 9 a table illustrating the configuration of the work load administration table;

FIG. 10 is a table illustrating the configuration of the deletion administration table;

FIG. 11 is a table illustrating the configuration of the use area list;

FIG. 12 is a table illustrating the configuration of the unused area list;

FIG. 28 is an example illustrating a matrix of the number of blocks; and

FIG. 29 is an example illustrating the CPU allocation matrix.

DETAILED DESCRIPTION OF THE PREFERRED EMBODIMENTS

The embodiments of the present invention are described below with reference to the accompanying drawings.

First Embodiment

Figure 1:
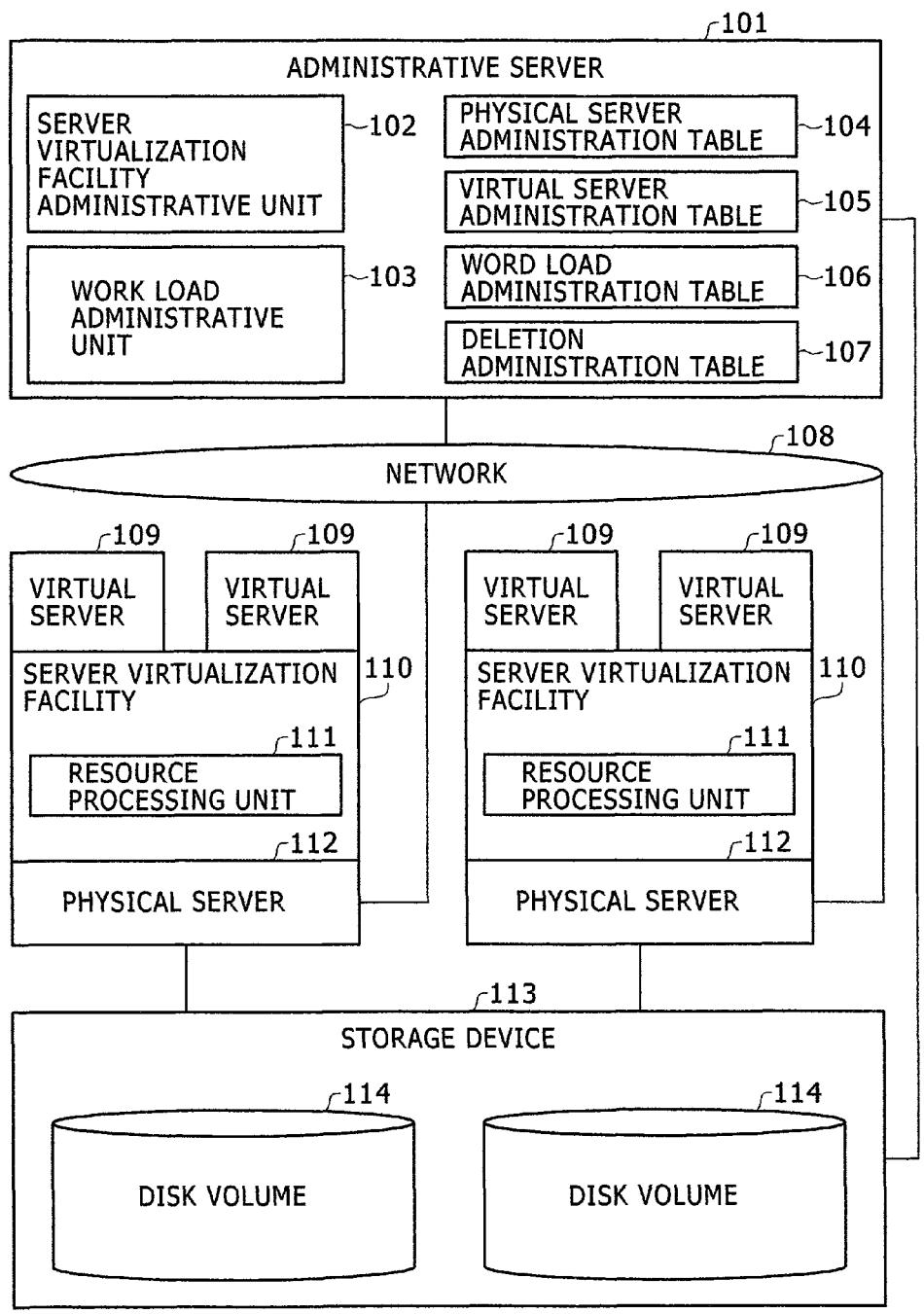
FIG. 1 is a general schematic diagram of a first embodiment.

FIG. 1 is a general schematic diagram of the first embodiment. An administrative server 101 includes a server virtualization facility administrative unit 102, a work load administrative unit 103 and various tables 104 to 107. The administrative server 101 is connected to a physical server 112 through a network 108. The physical server 112 is equipped with a server virtualization facility 110 (which is software and/or hardware for generating and deleting a virtual server and executing and controlling the virtual server, referred to as "server virtualization facility," but, may be referred to as "virtual server control program" or "virtual server monitor system"). The server virtualization facility 110 can generate plural virtual servers 109 and executes it independently. The server virtualization facility 110 includes a resource processing unit 111.

The physical server 112 is connected to a storage device 113 formed of plural disk volumes 114. The storage device 113 may be a disk unit built in a server or an external device (RAID system or the like) through a network such as a fiber channel.

The physical server 112 is a server system as hardware and is referred to as "physical server" to precisely define a term. The administrative server 101 is also a server system as hardware and is referred to as "administrative server" to focus attention on its function to be realized.

The administrative server 101 receives a request for deleting a virtual disk in the disk volume 114 allocated to the virtual server 109 from a user or an administrator (hereinafter referred to as "user") and then selects a server virtualization facility whose load is low to erase information in the area of the virtual disk with the load of the server virtualization facility being so low as not to influence other virtual servers. Specifically, a low-load physical server is selected from among physical servers having the server virtualization facility as described later.

The server virtualization facility administrative unit 102 controls the allocation and the release of resources and the erasure of information in the virtual disk according to load conditions of the server virtualization facility. The work load administrative unit 103 adjusts the allocation of a CPU to the erasure of information in the virtual disk according to load of the server virtualization facility and monitors work load.

A physical server administration table 104 stores information on resources for each physical sever 112 such as CPU and disk information. A virtual server administration table 105 stores resource information allocated to each virtual server 109. A work load administration table 106 stores information on CPU allocation and utilization rate of each server virtualization facility 110 managed by the administrative server 101. A deletion administration table 107 stores information on area where a deleted virtual disk is divided and the status of deleting the divided area.

The server virtualization facility 110 controls the erasure of information in the area of the virtual disk and sequentially releases the erased area. A resource processing unit 111 processes resources in response to a request from the server virtualization facility administrative unit 102.

The present embodiment describes an example where the administrative server 101 receives a request for releasing the resources from a user, thereafter the server virtualization facility whose load is the lowest erases information in the area of the virtual disk and sequentially releases the erased area with the load of the server virtualization facility being so low as not to influence other virtual servers.

Figure 2:
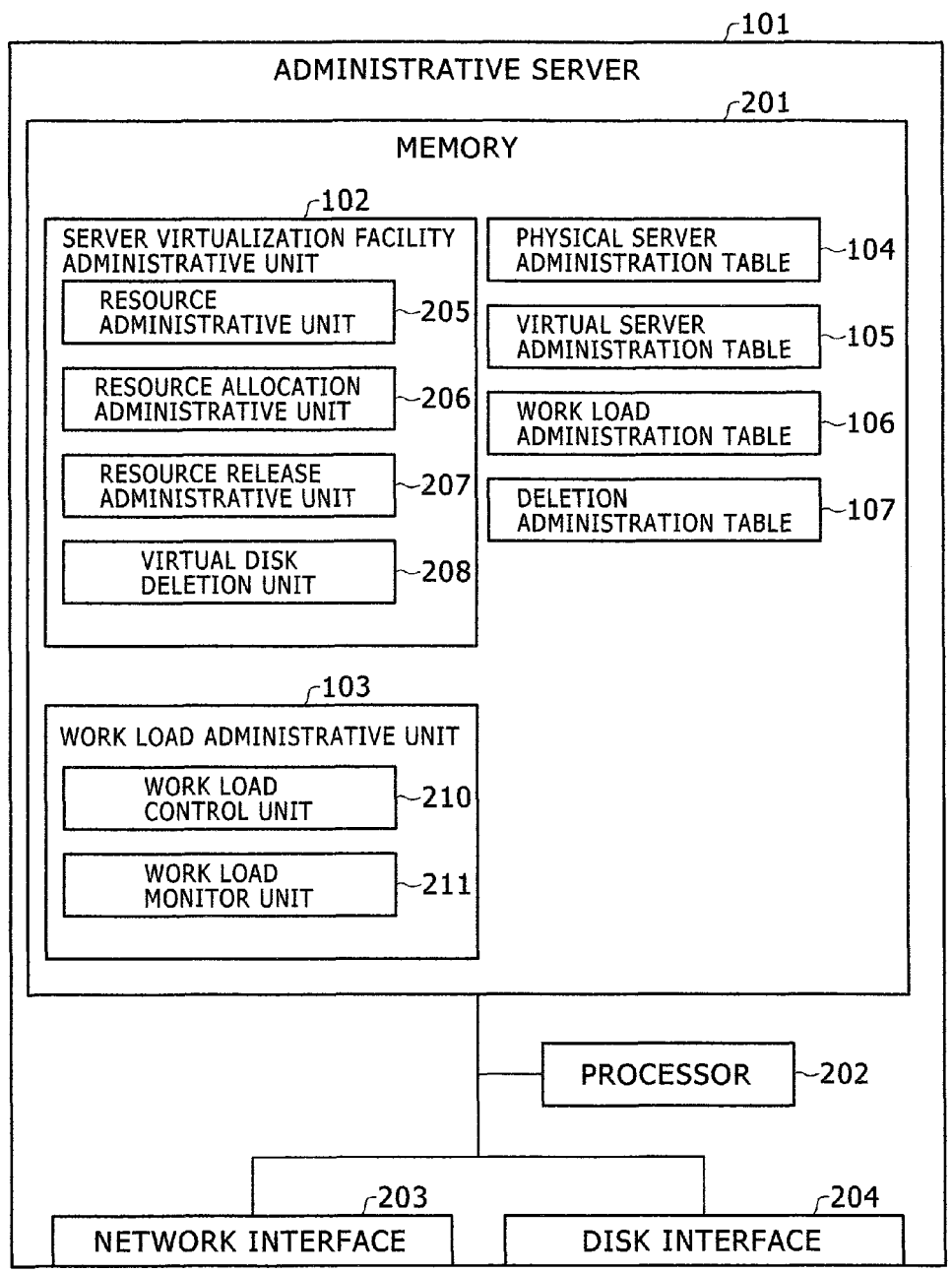
FIG. 2 is a diagram illustrating the configuration of the administrative server.

FIG. 2 is a diagram illustrating the configuration of the administrative server 101. The administrative server 101 includes a memory 201, a processor 202, a network interface 203 and a disk interface 204. The memory 201 stores the server virtualization facility administrative unit 102, the work load administrative unit 103, the physical server administration table 104, the virtual server administration table 105, the work load administration table 106 and the deletion administration table 107. The server virtualization facility administrative unit 102 includes a resource administrative unit 205, a resource allocation administrative unit 206, a resource release administrative unit 207 and a virtual disk deletion unit 208. The server virtualization facility administrative unit is a generic name including the above units. The work load administrative unit 103 includes a work load control unit 210 and a work load monitor unit 211. The work load administrative unit is a generic name including the above units.

The processor 202 executes the programs such as the resource administrative unit 205, the resource allocation administrative unit 206, the resource release administrative unit 207, the virtual disk deletion unit 208, the work load control unit 210 and the work load monitor unit 211 to advance such processes as resource administration, resource allocation administration, resource release administration, virtual disk deletion, work load control and work load monitor. The network interface 203 is connected to the network 108 and transmits various kinds of information to and receives them from the physical server 112.

Although processes such as resource administration, resource allocation administration, resource release administration, virtual disk deletion, work load control and work load monitor are realized by executing the programs by the processor 202, the processes may be incorporated into integrated circuit to realize them by hardware and/or firmware.

Figure 3:
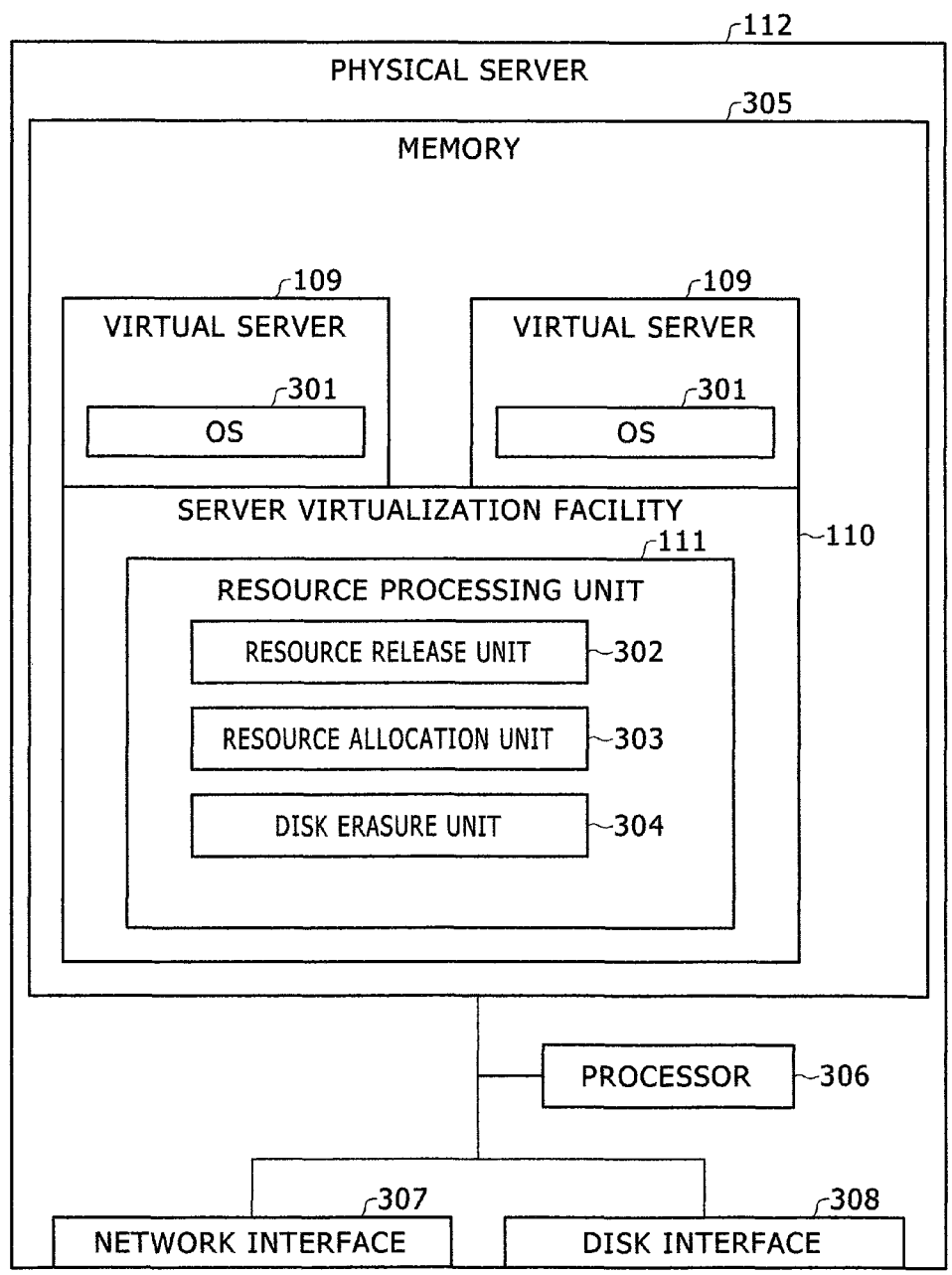
FIG. 3 is a diagram illustrating the configuration of the physical server.

FIG. 3 is a diagram illustrating the configuration of the physical server 112. The physical server 112 includes a memory 305, a processor 306, a network interface 307 and a disk interface 308. The disk interface 308 is connected to the storage device 113 or a dedicated disk unit.

The memory 305 stores the virtual servers 109 and the server virtualization facility 110. The resource processing unit 111 lies over the server virtualization facility 110. The processor 306 executes various kinds of programs such as a resource release unit 302, a resource allocation unit 303 and a disk erasure unit 304 in the resource processing unit 111.

The virtual server 109 into which OS301 is installed is capable of independently operating. The server virtualization facility 110 executes a process for dividing resources such as the memory 305 and the processor 306 and allocating them to the virtual server 109 (or the generation of a virtual server) and a process for controlling an execution schedule of the virtual server 109.

The resource release unit 302 releases resources such as disk volume 114 in the storage device 113 connected through the memory 305, the processor 306 and the disk interface 308 allocated to the virtual server 109 when the virtual server 109 is deleted.

The resource allocation unit 303 allocates resources such as disk volume 114 in the storage device 113 connected through the memory 305, the processor 306 and the disk interface 308 when the virtual server 109 is generated.

The disk erasure unit 304 erases information in the disk volume 114 used by the virtual server 109 when the virtual server 109 is deleted.

Incidentally, the processor 306 may be allocated to the disk erasure unit 304 similarly to the virtual server 109. That is to say, a work load may be set to the disk erasure unit 304 similarly to the virtual server 109 to enable the amount of process of the disk erasure unit 304 to be adjusted.

Although processes such as resource process, resource release, resource allocation and disk erasure are realized by executing the programs by the processor 306, these processes may be incorporated into an integrated circuit to realize them by hardware and/or firmware.

Figure 4:
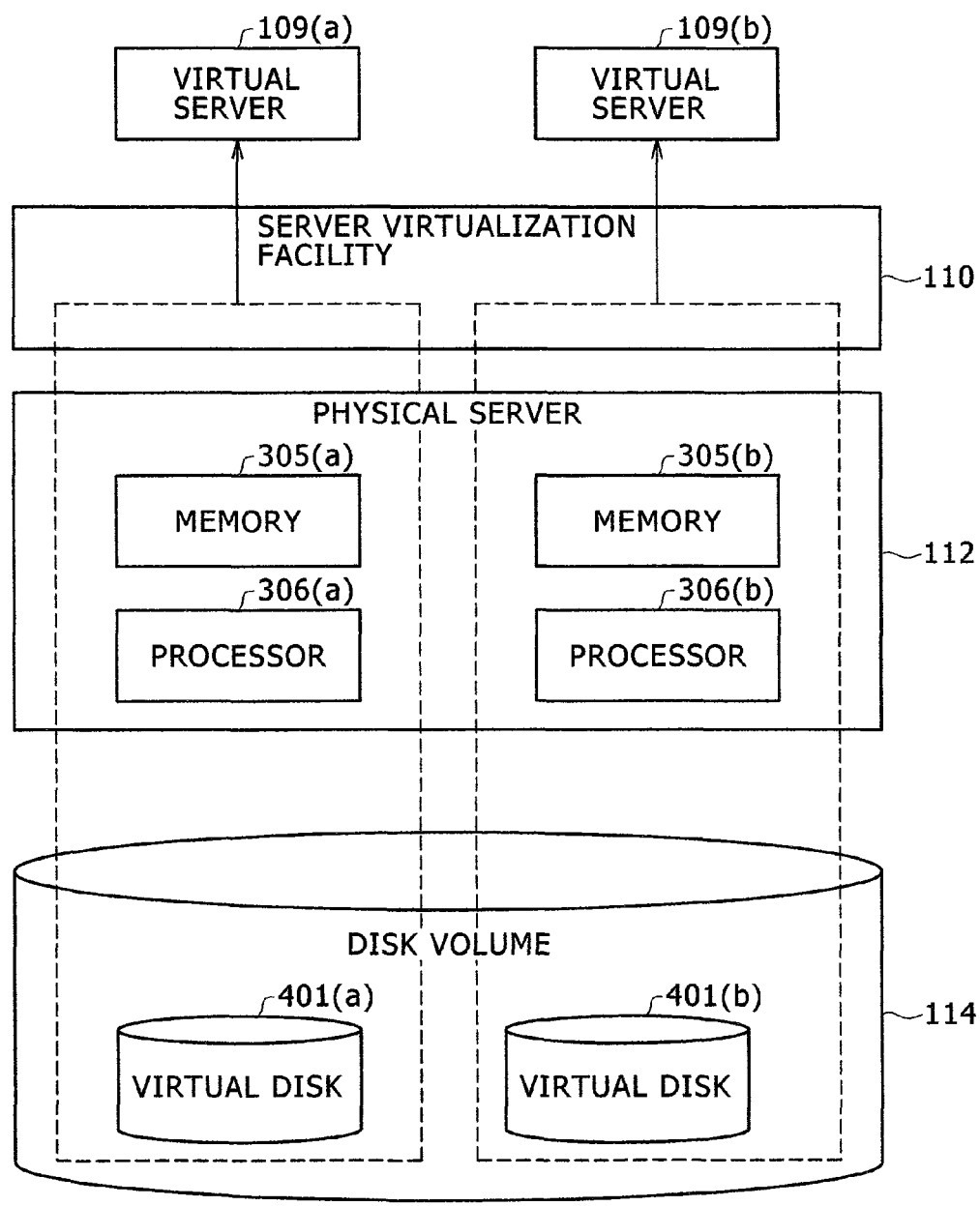
FIG. 4 is a diagram illustrating how resources are allocated to the virtual server.

FIG. 4 illustrates how resources are allocated to the virtual server 109. FIG. 4 illustrates that the server virtualization facility 110 allocates a memory 305(a) and a processor 306(a) in the physical server 112 and a disk area provided in the disk volume 114 as a virtual disk 401(a) to a virtual server 109(a); and the server virtualization facility 110 allocates a memory 305(b) and a processor 306(b) in the physical server 112 and a disk area provided in the disk volume 114 as a virtual disk 401(b) to a virtual server 109(b). The memory 305(a) and the memory 305(b) are different partial areas in the memory 305 illustrated in FIG. 3. The partial areas can be physically the same if the virtual memory technique is used, but are logically different areas (pages). The processors 306(a) and 306(b) illustrate that the processor 306 is partially used at a predetermined rate of time. The virtual disks 401(a) and 401(b) are different partial areas in the disk volume 114.

As described above, the term the allocation of the memory 305 refers to the allocation of part of the memory 305 of the physical server 112 managed by the server virtualization facility 110 as a dedicated area of the virtual server 109. The term the allocation of the processor 306 refers to the scheduling of the virtual server 109 so as to use the processor 306 according to a predetermined rate of time. The term the allocation of a virtual disk 401 refers to the allocation of a partial area of the disk volume 114 as a dedicated area of the virtual server 109.

The virtual disk 401 is a partial area of the disk volume 114 and looks like a general disk viewed from the OS301 operating on the virtual server 109, actually however, it uses only a partial area provided in the disk volume 114.

There are several methods of providing the virtual disk in the disk volume 114. For example, there is a method of controlling the virtual disk 401 as a file. Incidentally, the capacity of the virtual disk 401 can be set at the user's discretion when the virtual server 109 is generated. If there is plural the disk volumes 114, one virtual disk 401 may be generated across the plural the disk volumes 114.

Figure 5:
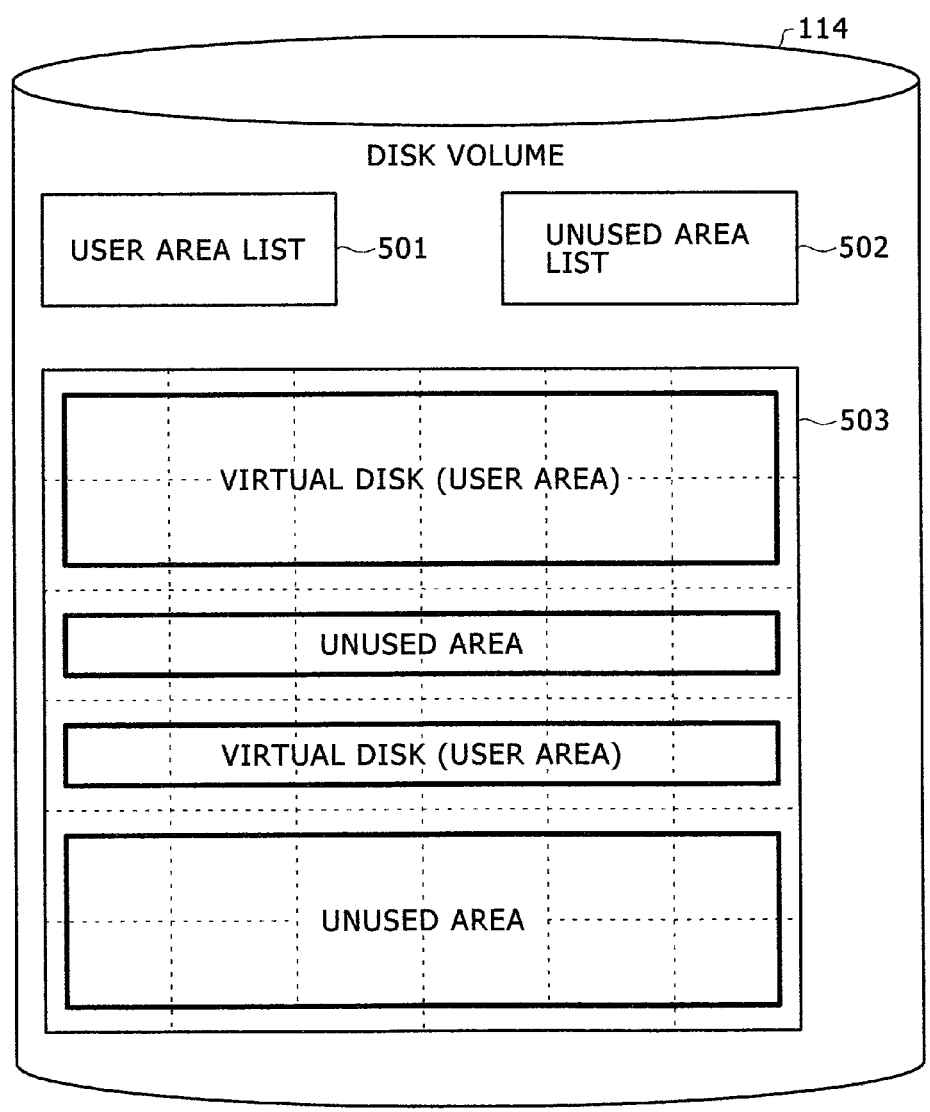
FIG. 5 is a diagram illustrating the configuration of the disk volume.

FIG. 5 is a diagram illustrating the configuration of the disk volume 114. The disk volume 114 includes an area 503 allocated as the virtual disk 401, a use area list 501 and an unused area list 502. The use area list 501 stores information on the allocation of the virtual disk 401 in the area 503. The unused area list 502 stores information on space area (area which is not allocated as the virtual disk) in the area 503.

The area 503 is one to be allocated as the virtual disk 401. The area 503 is segmented into blocks with a fixed length, for example, and managed whether it is used or unused in units of a block. This allows allocating the number of block with a required capacity, eliminating the need for allocating a continuous area when the area of the disk volume 114 is allocated to the virtual disk 401. As a result, the area of the disk volume 114 can be effectively used.

Figure 6:
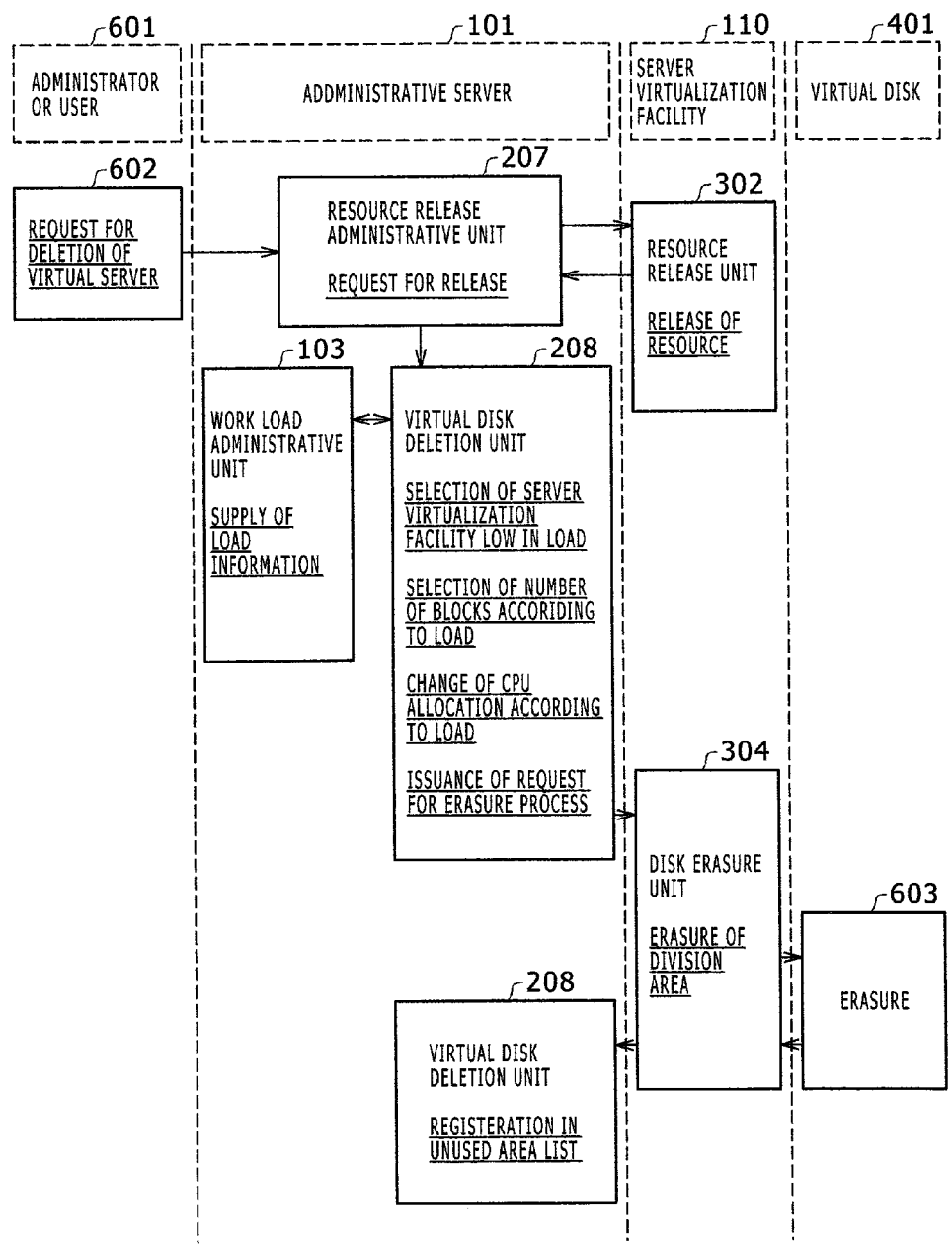
FIG. 6 is a diagram illustrating the outline of process in the first embodiment.

FIG. 6 outlines the process in the present embodiment. When a user 601 issues a request 602 for deleting the virtual server 109, the resource release administrative unit 207 in the administrative server 101 issues a request for releasing the resource used by the virtual server 109 to the server virtualization facility 110. The resource release unit 302 in the server virtualization facility 110 releases the resource allocated to the virtual server 109. The process is shifted to the virtual disk deletion unit 208 in the administrative server 101 to release the virtual disk 401 as part of the release of the resource. The virtual disk deletion unit 208 selects the server virtualization facility which erases the disk area according to the load condition of the server virtualization facility 110, selects the number of blocks to be erased at one time, or adjusts the allocation (work load) of the CPU306 in the physical server 112 according to the load condition of the selected server virtualization facility 110.

This allows executing an erasing process in the disk area which is high in load without influencing the process of other servers 109. The virtual disk deletion unit 208 divides the virtual disk 401 and executes the erasing process in the disk area to permit the disk volume to be speedily released. The disk erasure unit 304 in the server virtualization facility 110 executes an erasing process in the virtual disk.

At this point, the work load administrative unit 103 adjusts the work load of the disk erasure unit 304 according to the load condition of the CPU306 in the physical server 112 executing the disk erasure unit 304 so as not to influence the processing performances of other virtual servers. The disk erasure unit 304 erases (603) information in the area of the virtual disk 401 and the virtual disk deletion unit 208 registers the erased area in the unused area list 502. The area registered in the unused area list 502 is one in which information has been completely erased. Even if the area is allocated again to other virtual servers 109, the deleted contents in the virtual disk 401 will not be read to enable high security to be maintained.

FIG. 7 is a table illustrating the configuration of the physical server administration table 104. A column 701 indicates a physical server identifier. If there are plural physical servers 110, plural physical server identifiers are stored therein. A column 702 stores performance specifications of the CPU (processor). The table shows that, for example, the physical server 112 with a server 1 as the plural physical server identifier is provided with two CPUs with an operating clock frequency of 2 GHz. A column 703 stores the capacity of the memory 306 in the physical server 112.

A column 704 stores information on devices connected to the physical server 112. For example, in the case of Network Interface Card (NIC), a kind or a Media Access Control (MAC) address which is an inherent identifier is stored. In the case of Host Bus Adaptor (HBA), a World Wide Name (WWN) is stored.

A column 705 stores information on disks connected to the physical server 112. The volume identifier and the capacity of the disk volume 114 in the storage device 113 are stored therein. The disk volume 114 stored in the column 705 may be shared with the other physical servers. In this case, the same volume identifier is stored in the physical servers which share the disk volume 114.

FIG. 8 is a table illustrating the configuration of the virtual server administration table 105. A column 801 stores a server virtualization facility identifier. One physical server 112 normally includes one server virtualization facility 110, but a system may be realized in which one physical server 112 includes plural server virtualization facilities 110. A column 802 stores the identifier of the physical server operated by the server virtualization facility 110.

A column 803 stores a virtual server identifier. The virtual server identifier does not need to be a unique value (code) across plural server virtualization facilities 110, however, it is a unique value (code) in one server virtualization facility 110. The number of the physical servers 109 registered in the virtual server identifier 803 varies according to the generation and the deletion of the physical server 109 by the server virtualization facility 110.

A column 804 stores resources allocated to the physical servers 109. The resources include, for example, allocation status in the CPU, memory capacity, NIC information and virtual server identifiers. A column 805 shows status of the virtual servers 109. The status provides information that the virtual server is operating or not operating (i.e., the virtual server is generated, however, it is not operating now). This status information enables an operating virtual server 109 to be grasped, facilitating obtaining the load of the physical server 112.

FIG. 9 is a table illustrating the configuration of the work load administration table 106. A column 901 stores a server virtualization facility identifier. A column 902 stores an operating physical server identifier. The operating physical server identifier indicates an identifier of the physical server 112 in which the server virtualization facility 110 with the server virtualization facility identifier shown in the column 901 operates. If plural the server virtualization facilities 110 is operating on one physical server 112, the same operating physical server identifier 902 is stored correspondingly with the plural the server virtualization facility identifiers 901.

A column 903 stores a virtual server identifier. It stores the identifier of the virtual server 109 which is generated by the server virtualization facility 110 designated in the server virtualization facility identifier 901 and is subjected to the control of work load. In the present embodiment, the process of the disk erasure unit 304 for erasing information stored in the virtual disk is also registered in the work load administration table 106 to control the process of the disk erasure unit 304 to be subjected to work load control. A disk erasure process is registered in the work load administration table 106 in response to a request for deleting the virtual disk 401 corresponding to instructions for deleting the virtual server 109 and deleted from the work load administration table 106 in response to the completion of erasure of information in the virtual disk 401.

A column 904 stores CPU allocation. The CPU allocation refers to the amount of a CPU to be allocated to the virtual server 109 (representing the amount of time rate and the amount of performance rate). The larger the CPU allocation, the higher the processing performances of the virtual server 109 become.

The CPU allocation and unit thereof may be specified at the user's discretion. A value may be stored as an allocation rate for each virtual server 109 with the whole server virtualization facility 110 as 100%. There is no need for allocating the whole performances of the server virtualization facility 110 to virtual server 109. An unused CPU may be left to prepare rapid increase in load of the virtual server 109.

A column 905 stores the physical CPU utilization rate. The physical CPU utilization rate is one in the case where the total amount of process of the CPU306 of the physical server identifier 902 is taken as 100%, collected by the work load monitor unit 211 described later and stored.

Incidentally, the physical CPU utilization rate may be calculated from time during which the server virtualization facility 110 schedules the utilization rate of the CPU in the virtual server 109 or the utilization rate of the virtual server 109 itself may be collected on the virtual server 109 to multiply the utilization rate by the CPU allocation 904. The load of the physical server 112 shown by the operating physical server identifier 902 can be known from the physical CPU utilization rate 905.

FIG. 10 is a table illustrating the configuration of the deletion administration table 107. The deletion administration table 107 is used for erasing information in the virtual disk 401 and stores the virtual disk 401 which is being executing the process for erasing information and information for partially releasing the virtual disk 401. A column 1001 stores a virtual disk identifier. A column 1002 stores the identifier of the disk volume 114 including the virtual disk 401 shown by the virtual disk identifier 1001. Plural the virtual disks 401 may be included in one disk volume 114.

A column 1003 stores a logic block number. A logic block number 1003 is set correspondingly with a physical block number 1004 and given numbers so that it looks like a continuous area from the user's point of view. The physical block number is described later. A column 1005 stores a division file name. The term the division file refers to a file name corresponding to a block shown by one or more logic block numbers 1003. A virtual disk identifier 1001 shows the file name of the virtual disk 401, on the other hand, a division file name 1005 shows an area (division file) where the virtual disk 401 is divided into several parts.

In the present embodiment, the division file is released in units of the division file instead of in units of the virtual disk 401 so that the required capacity of the virtual disk 401 can be allocated according to the generation of a new virtual server 109. After the erasure process of stored information has been executed in units of the division file and completed, the division file is released to enable increasing the space capacity (unused area) in the disk volume 114 and providing a high degree of freedom for the allocation of the virtual disk 401 to a new virtual server 109. This is because releasing the area of the virtual disk 401 in units of the virtual disk 401 takes much time to erase the stored information if the capacity of the virtual disk 401 is large, as a result, the area of the virtual disk 401 cannot be allocated to a new virtual disk 109 (which causes a situation where the degree of freedom of allocation is low).

A column 1006 stores the status of the division file. The status shows "completion of erasure" of information in a division file, "under execution" of the erasure process and "unerased." Incidentally, as can be seen from the description given later, the "unerased" status is not stored and the column is blank. A column 1007 stores the identifier of the virtual server which executes the process for erasing information in the virtual disk 401. This identifier is used to distribute the process so that the erasure process less influences the performances of the entire system because the load of the CPU for the process for erasing information in the virtual disk 401 is high and to perform control so that the erasure process can be executed by the physical server 112 which is low in load. Incidentally, if plural the server virtualization facilities 110 are operated by one physical server 112, the server virtualization facility identifiers may be stored in the column 1007.

Although the above description is made on the assumption that the physical server administration table 104, the virtual server administration table 105, the work load administration table 106 and the deletion administration table 107 are included in the administrative server 101, information inherent in the individual physical server 112 or server virtualization facility 110 is desirably stored in tables provided in the individual physical server 112 or server virtualization facility 110. It is determined whether each information is held in both the administrative server 101 and either the individual physical server 112 or the server virtualization facility 110 or in one of them in consideration of the amount of transfer data between the administrative server 101 and the individual physical server 112 and data transfer frequency from the viewpoint of package.

FIG. 11 illustrates the configuration of the use area list 501. A column 1101 stores a virtual disk identifier. Columns 1102 and 1103 store a logic block number and a physical block number respectively. The virtual disk 401 looks like a continuous area in the order of the values expressed by the logic block numbers from the OS301 operating on the virtual server 109. Areas corresponding to logic block numbers 1102 are designated by physical block numbers 1103.

The logically continuous area seen from the OS301 on the virtual server 109 and the area expressed by a physical block number are mapped to allow the physical block corresponding to a discontinuous area in the disk volume 114 to correspond to the logic block, enabling the area in the disk volume 114 to be effectively used. That is to say, since the physical block may be actually discontinuous, the continuous area seen from the OS301 can effectively use the space area in the disk volume 114. Incidentally, the use area list 501 has information which causes the logic block number 1102 and the physical block number 1103 for each the virtual disk 401 generated in the disk volume 114 to correspond to each other.

FIG. 12 illustrates the configuration of the unused area list 502. The unused area list 502 stores a physical block number 1201 in the unused area which is not allocated as the virtual disk 401 in the disk volume 114. When a new virtual disk 401 is allocated, a required amount is secured from the physical block number 1201 shown in the unused area list 502 and registered in the use area list 501.

If the virtual disk 401 is deleted from the use area list 501, the area which has been allocated to the deleted virtual disk is added to the unused area list 502.

Incidentally, the physical block number expressing all areas which the storage device 113 provides for server virtualization facility 110 as the disk volume 114 does not always exist in any of the use area list 501 and the unused area list 502. The area corresponding to the physical block number existing in any of the use area list 501 and the unused area list 502 is one which can be allocated to the virtual server 109 as the virtual disk 401. The area of the physical block numbers which express the disk volume 114 and do not exist in any of the use area list 501 and the unused area list 502 is used by the server virtualization facility 110 itself or used for applications excluding the virtual disk under the control of the server virtualization facility 110.

The physical block number in the first embodiment does not need to indicate the physical block (or, a block represented by the physical address of a disk) of a disk unit, but needs to indicate a block representing the area of a disk volume seen from the server virtualization facility 110. For this reason, if plural the server virtualization facilities 110 is included in one physical server 112, in general, mapping is further needed between blocks recognized by the server virtualization facility 110 and the physical server 112.

The blocks (address) recognized by the server virtualization facility 110 or the physical server 112 are provided by the storage device 113. The number of blocks indicating the area of the disk volume 114 provided by the storage device 113 for the server virtualization facility 110 or the physical server 112 continues. The disk volume 114 looks like a continuous area from the server virtualization facility 110 or the physical server 112, but it is virtualized in the storage device and does not always physically correspond to a continuous area on the disk. As described above, in the present embodiment, although the physical block number is uses as a term, it does not always represent a physical area on a disk.

The processes of the administrative server 101 and the physical server 112 are described below with reference to their respective flow charts. In the following description, each step in the flow chart, for example, a step 1301 is expressed by S1301.

Figure 13:
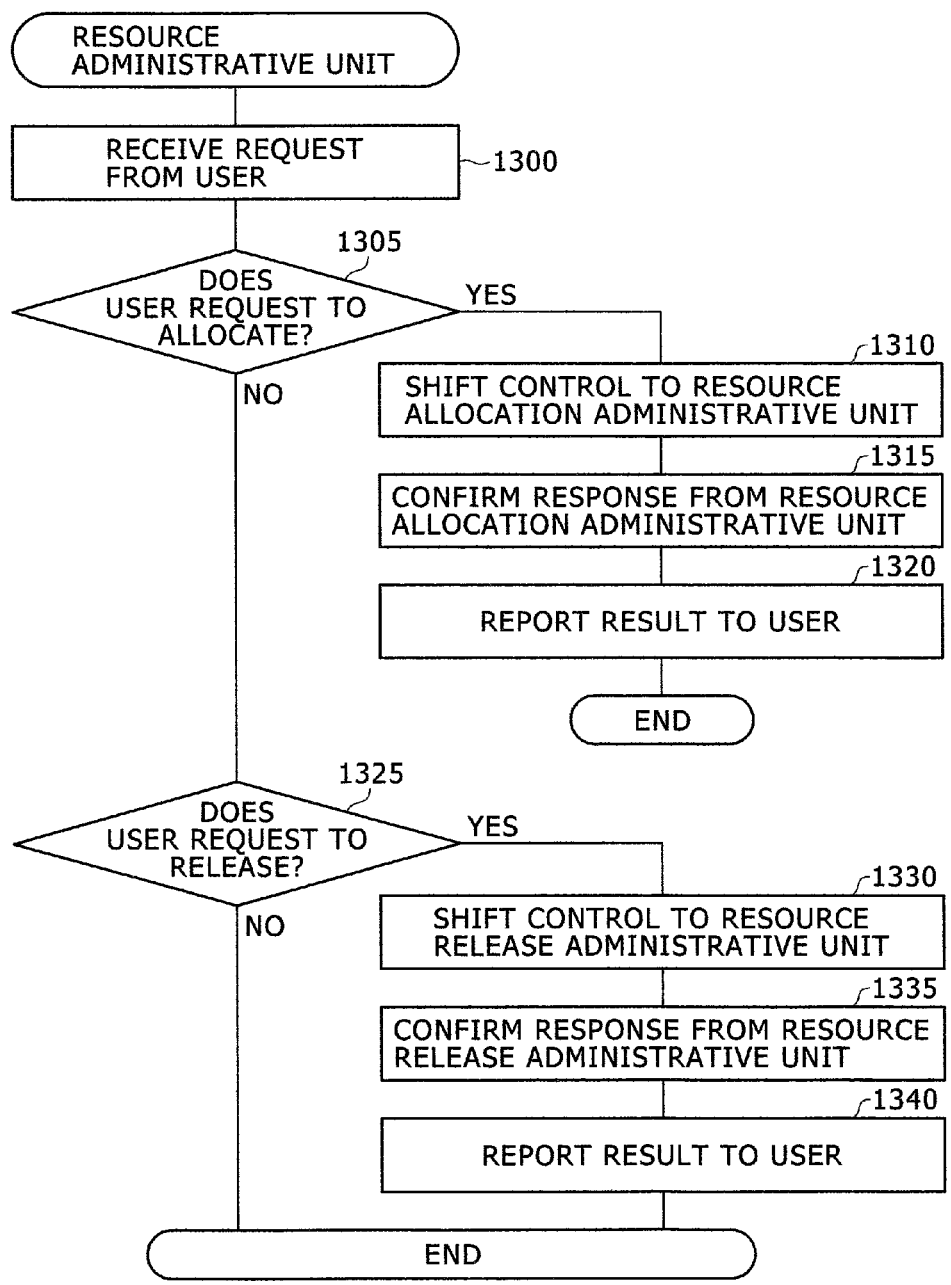
FIG. 13 is a flow chart of the resource administrative unit.

FIG. 13 is a flow chart illustrating the flow of a resource control performed by the resource administrative unit 205. The resource control is a process for dividing requests for allocating or releasing resources from users.

The request for allocating resources refers to a request for generating the virtual server 109. The user issues a request for allocating resources using parameters such as the physical server identifier 701 or the server virtualization facility identifier 801 for generating the virtual server, the allocation of the CPU to the virtual server 109 to be generated, memory capacity, the capacity of the virtual disk 401 and the kinds and the number of I/O devices if required.

The request for releasing resources refers to a request for deleting the virtual server 109. That is to say, it is a request for releasing resources such as CPUs, memories and virtual disks 401 allocated to the virtual server 109. The release request is issued with the virtual server identifier 803 desired to be deleted as a parameter.

The resource administrative unit 205 receives a resource request from the user (S1300). A determination is made as to whether the request from the user is a request for allocation (S1305). The request for allocation is issued in the case where the virtual server is newly generated or the resource is additionally allocated to the existing virtual server. If the request from the user is the request for allocation, the resource administrative unit 205 shifts control to the resource allocation administrative unit 206 (S1310) and waits for a response from the resource allocation administrative unit 206.

The resource administrative unit 205 confirms the response from the resource allocation administrative unit 206 (S1315) and reports a result of process for the request for allocation to the user (S1320). If a virtual server is newly generated, the virtual server identifier 803 and an allocated resource (804) are added to the virtual server administration table 105. If a resource is additionally allocated to the existing virtual server, the resource (804) allocated correspondingly with the specified existing virtual server is added to the virtual server administration table 105.

If the request from the user is not the request for allocation, the resource administrative unit 205 determines whether the request from the user is a request for release (S1325). The request for release is issued in the case where a virtual server is deleted or a specific resource is deleted from a virtual server. If the request from the user is the request for release, the resource administrative unit 205 shifts control to the resource release administrative unit 207 (S1330) and waits for a response from the resource release administrative unit 207.

The resource administrative unit 205 confirms the response from the resource release administrative unit 207 (S1335) and reports a result of process for the request for allocation to the user (S1340).

Figure 14:
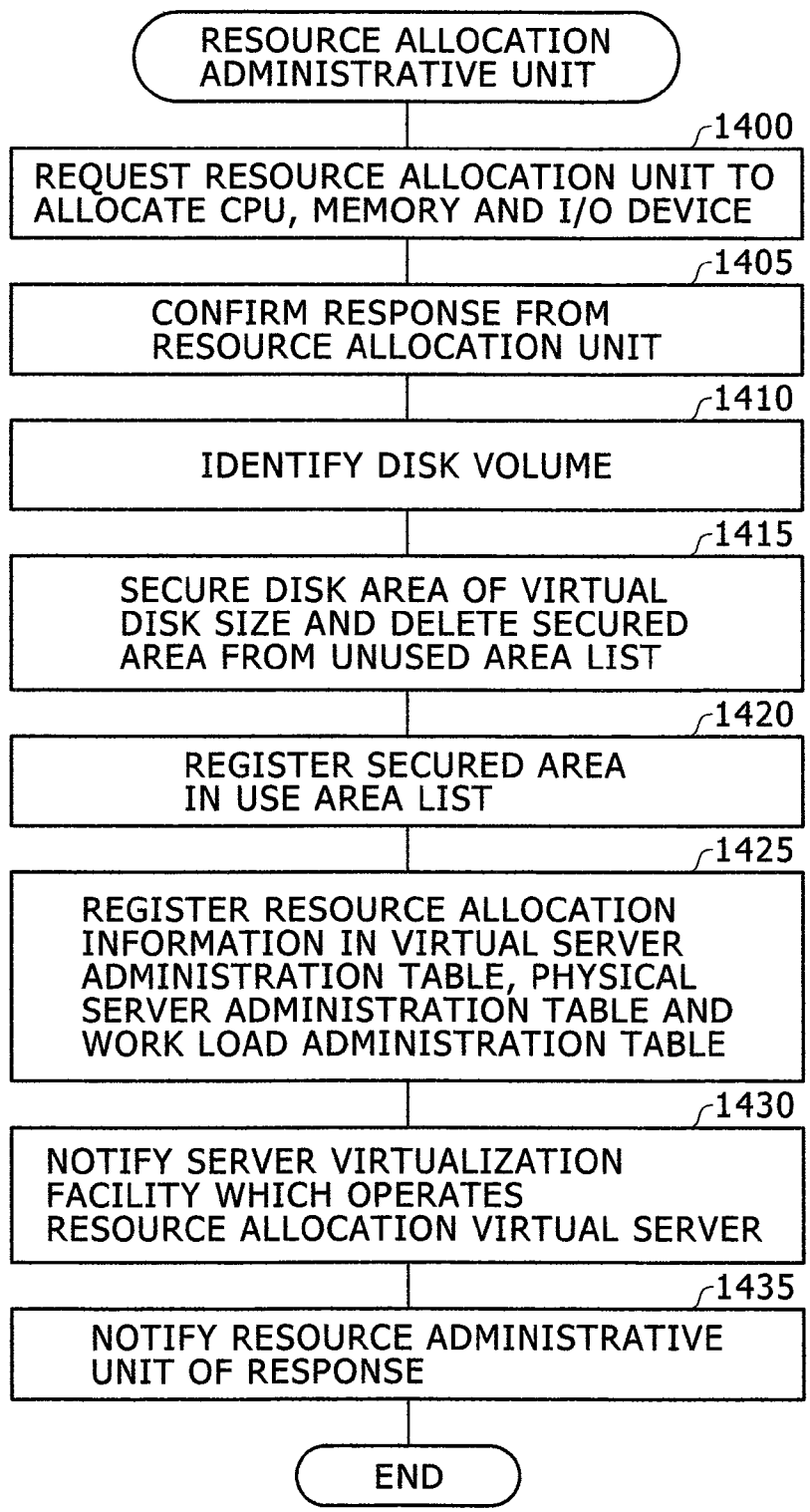
FIG. 14 is a flow chart of the resource allocation administrative unit.

FIG. 14 is a process flow in the resource allocation administrative unit 206. This process is called from the resource administrative unit 205 and executed at the time of generating a new virtual server or additionally allocating a resource to the existing virtual server.

If a new virtual server is generated, the resource allocation administrative unit 206 requests the resource allocation unit 303 in the server virtualization facility 110 which generates the virtual server to allocate a CPU, a memory and an I/O device (S1400). If a resource is additionally allocated to the existing virtual server, the resource allocation administrative unit 206 requests the resource allocation unit 303 in the server virtualization facility 110 in which the existing virtual server exists to allocate a CPU, a memory and an I/O device (S1400). The parameters of this request vary according to the cases where a new virtual server is generated and a resource is additionally allocated. The parameters include the allocation of the CPU to the virtual server 109, memory capacity and the kinds and the number of I/O devices if required.

The resource allocation administrative unit 206 confirms the response from the resource allocation unit 303 (S1405). The resource allocation administrative unit 206 refers to the physical server administration table 104 and the virtual server administration table 105 to generate the virtual disk specified by the resource administrative unit 205 and identifies the disk volume 114 available for the server virtualization facility 110 in which a virtual server operates and which generates a virtual server or allocates resources (S1410). The resource allocation administrative unit 206 secures the disk area for the capacity of the virtual disk specified by the resource administrative unit 205 from the unused area list 502 in the identified disk volume 114 and deletes the secured area from the unused area list 502 (S1415). The area to be secured is preferably a continuous space area as close to a virtual-disk size as possible.

The secured area is registered in the use area list 501 (S1420). The deletion of the secured area from the unused area list 502 and the registration of it in the use area list 501 change the secured area into a virtual disk used by the requested virtual sever which other servers cannot access.

The resource allocation administrative unit 206 registers the result of allocating resources by the resource allocation unit 303 from which the response has confirmed and result of generating the virtual disk in the virtual server administration table 105, the physical server administration table 104 and the work load administration table 106 as resource allocation information (S1425). The resource allocation administrative unit 206 notifies of the result of allocating resources the server virtualization facility 110 in which the target virtual server 109 operates (S1430). The server virtualization facility 110 operates the virtual server 109 in response to the notification. A detailed description on the start of the virtual server 109 is omitted here. The resource allocation administrative unit 206 reports the result of allocating resources to the resource administrative unit 205 as its response (S1435).

Figure 15:
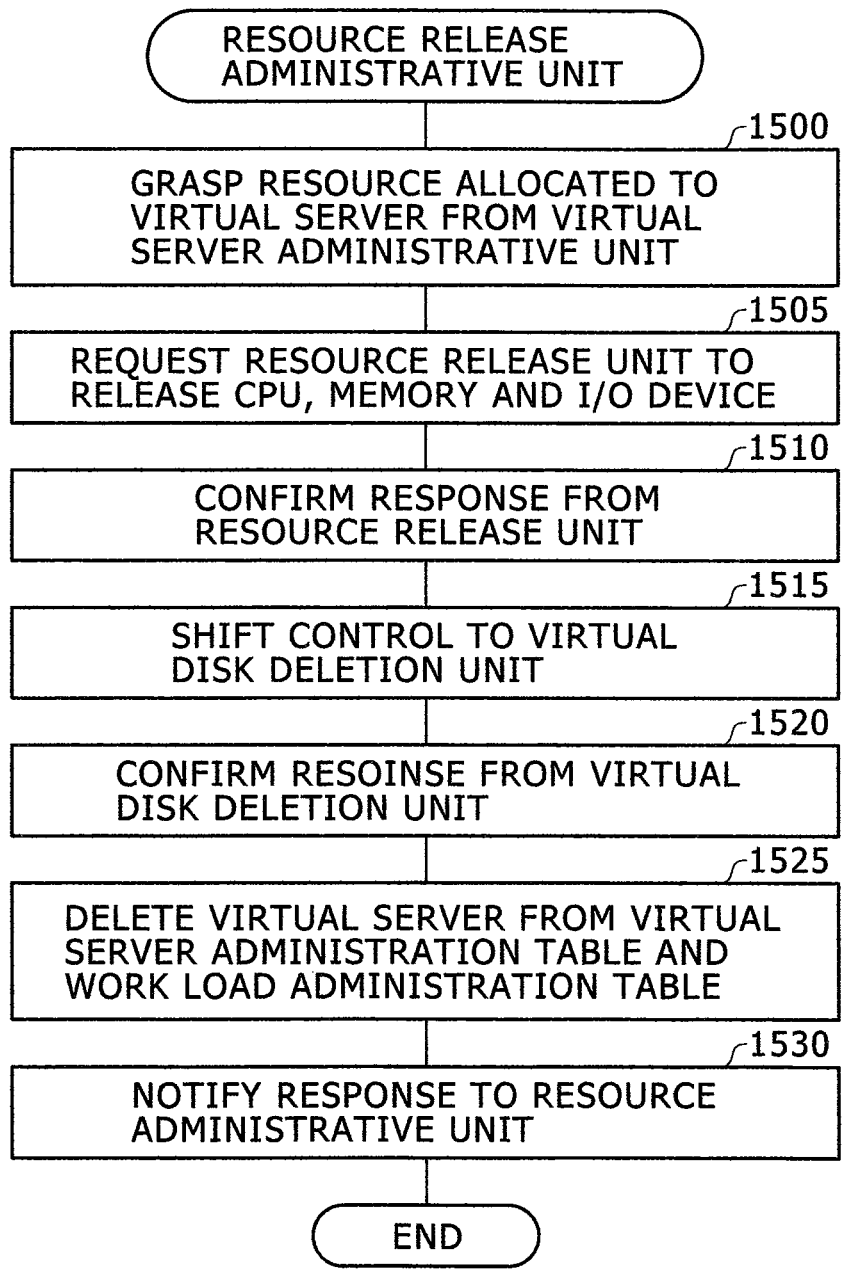
FIG. 15 is a flow chart of the resource release administrative unit.

FIG. 15 is a process flow of the resource release administrative unit 207. This process is called from the resource administrative unit 205 and executed at the time of deleting a virtual server or releasing a specific resource from a virtual server.

The resource release administrative unit 207 grasps the resource allocated to the virtual server 109 specified by the resource administrative unit 205 with reference to the resource administrative unit 205 (S1500).

The resource release administrative unit 207 requests the resource release unit 302 in the server virtualization facility 110 in which the specified virtual server 109 operates to release the grasped allocation resources such as a CPU, a memory and an I/O device (S1505). The parameter of this request is the virtual server identifier 803 for releasing resources. If the virtual server identifier 803 is known, resources (or, CPU allocation, memory capacity and the kinds and the number of I/O devices if required) allocated to a virtual server can be grasped with reference to the virtual server administration table 105. Although description is omitted, the result of allocating resources of which the resource allocation administrative unit 206 notifies the server virtualization facility 110 at S1430 in FIG. 14 is retained, so that the resource release unit 302 may use the retained information. The resource release administrative unit 207 confirms the response of which the resource release unit 302 has notified the resource release administrative unit 207 (S1510).

The resource release administrative unit 207 shifts control to the virtual disk deletion unit 208 to delete the virtual disk 401 grasped at S1500 (S1515). The resource release administrative unit 207 confirms the response from the virtual disk deletion unit 208 (S1520). The response includes the erasure of information stored in the specified virtual disk 401 and the deletion of the area used as the virtual disk 401 from the use area list 501 to add it to the unused area list.

The resource release administrative unit 207 deletes information in the deleted virtual server from the virtual server administration table 105 and the work load administration table 106 (S1525). If the virtual server is deleted, the resource release administrative unit 207 notifies the resource administrative unit 205 of the deletion of the virtual server and the release of resources used by the virtual server as its response. If a specific resource is released from a virtual server, the resource release administrative unit 207 notifies the resource administrative unit 205 of the release of the resource as its response.

Figure 16:
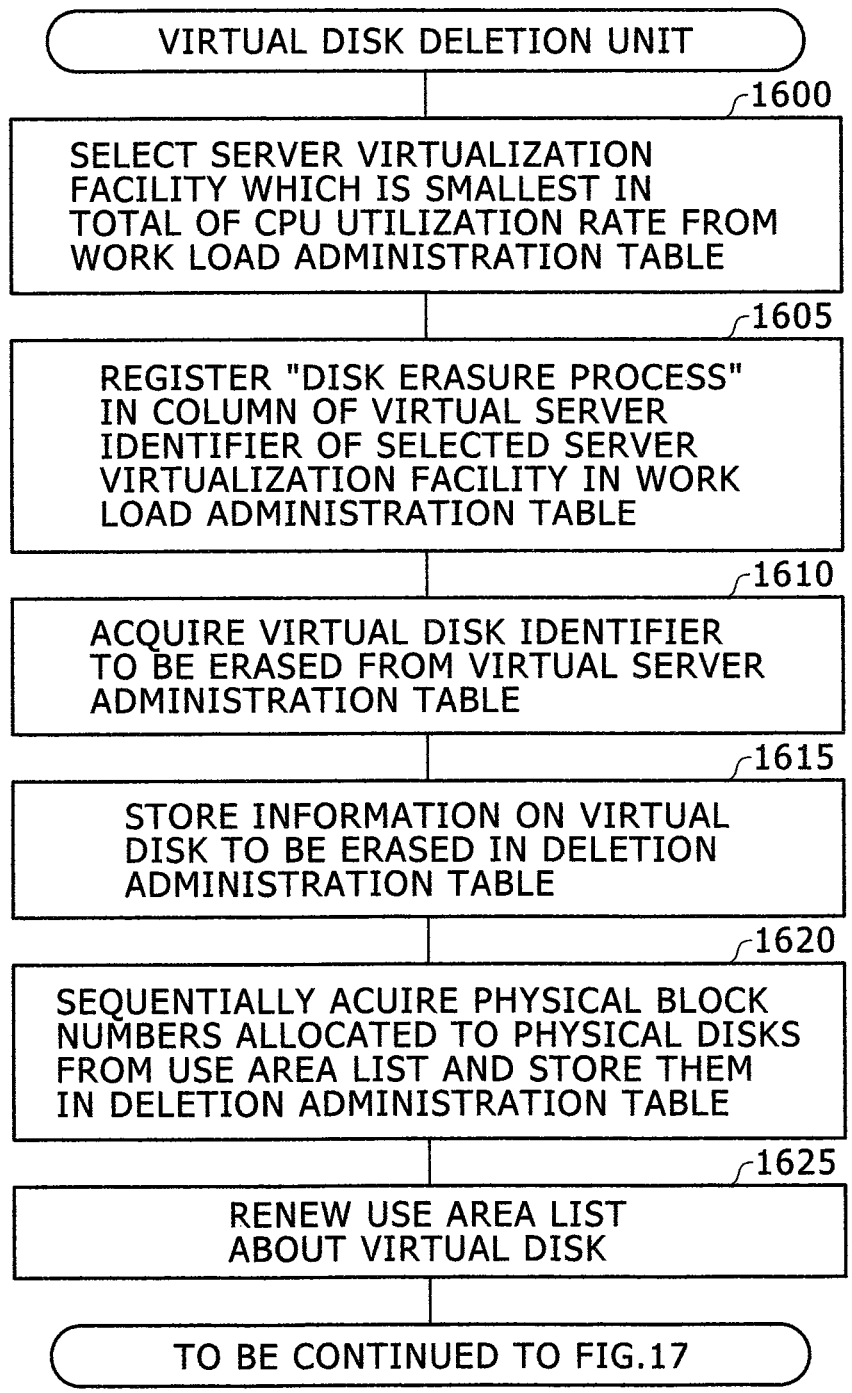
FIG. 16 is the first half of a flow chart illustrating the virtual disk deletion unit.
Figure 17:
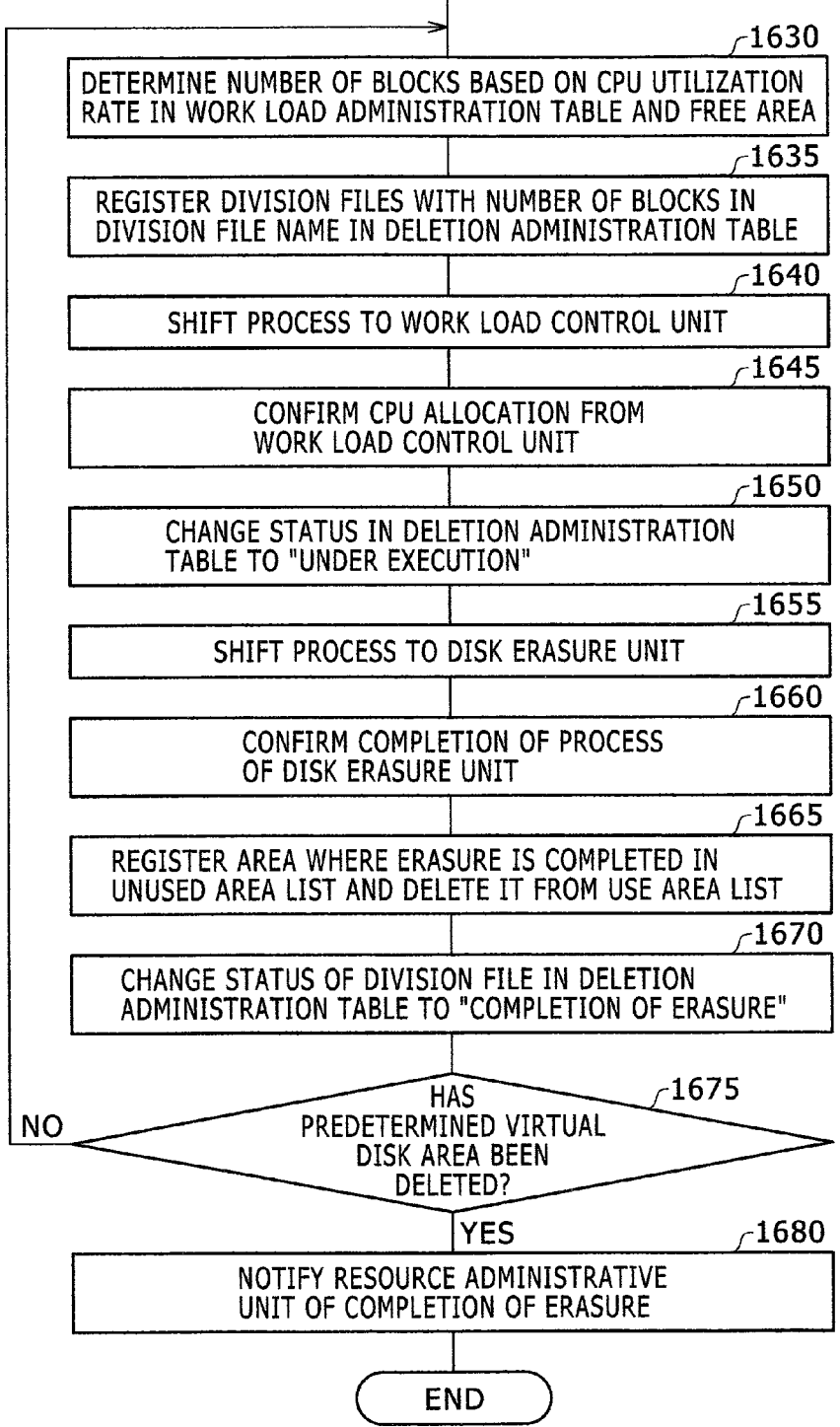
FIG. 17 is the second half of a flow chart illustrating the virtual disk deletion unit.

FIGS. 16 and 17 are a process flow of the virtual disk deletion unit 208. The virtual disk deletion unit 208 selects the server virtualization facility 110 which is the smallest in the total CPU utilization rate from the work load administration table 106 (S1600). The smallest total CPU utilization rate in the server virtualization facility 110 can be calculated by, for example, multiplying the CPU allocation 904 to the virtual server 109 by the physical CPU utilization rate stored in the work load administration table 106.

The following calculation can be made with reference to the work load administration table 106 in FIG. 9, for example. A virtual server 1 with a CPU allocation of 20 and a physical CPU utilization rate of 10% and a visualized server 2 with a CPU allocation of 30 and a physical CPU utilization rate of 20% are operating on a server virtualization facility 1, so that the CPU utilization rate of the server virtualization facility 1 is 20×0.1+30×0.2=8%. A virtual server 3 a CPU allocation of 30 and a physical CPU utilization rate of 20% is operating on a server virtualization facility 2, so that the CPU utilization rate of the server virtualization facility 2 is 30×0.2=6%. A virtual server 4 with a CPU allocation of 50 and a physical CPU utilization rate of 40% and a virtual server 5 with a CPU allocation of 30 and a physical CPU utilization rate of 20% are operating on a server virtualization facility 3, so that the CPU utilization rate on the server virtualization facility 3 is 50×0.4+30×0.2=26%. The virtual disk deletion unit 208 compares these CPU utilization rates and selects the server virtualization facility 2 which is the smallest in the CPU utilization rate as the server virtualization facility including a virtual disk to be deleted.

There may be used another calculation method in which the virtual disk deletion unit 208 obtains the time during which the server virtualization facility 110 schedules the use of a CPU in the virtual servers 109 from the server virtualization facilities 110. In addition, there is further another method in which the CPU utilization rate of the server virtualization facilities 110 including the virtual servers 109 is actually measured to use the measured values for calculation.

This permits information in the virtual disk 401 to be erased by the server virtualization facility 110 which is the lowest in load to enable distributing loads across plural the physical servers 112, allowing maintaining the balance of the loads in the entire system. The virtual disk deletion unit 208 registers "disk erasure process" in the column of the virtual server identifier of the selected server virtualization facility in the work load administration table 106 (S1605) to allow work load to be allocated for disk erasure process.

The virtual disk deletion unit 208 acquires a virtual disk identifier subjected to disk erasure process from the virtual server administration table 105 (S1610). The virtual disk deletion unit 208 stores information on a virtual disk to be erased in the deletion administration table 107 (S1615). Information stored in the deletion administration table 107 by the virtual disk deletion unit 208 includes the acquired virtual disk identifier, the disk volume identifier of a connection disk obtained from the physical server administration table 104 and the virtual server administration table 105 based on the virtual disk identifier, logic block numbers of the virtual disks indicated by the virtual disk identifier obtained with reference to the use list 501 of the disk volume indicated by the disk volume identifier and a process physical server identifier.

For example, FIG. 10 illustrates the case where information stored in the virtual disk 1 to be deleted is erased. It can be seen from the virtual server administration table 105 in FIG. 8 that the virtual disk 1 is used by the virtual server 1 controlled by the server virtualization facility 1 on the (physical) server 1. Referring to the physical server administration table 104 in FIG. 7, it can be seen that the connection disk of the (physical) server 1 is the disk volume 1. The logic block number of the virtual disk can be obtained from the use area list 501 of the disk volume 1.

However, if the virtual disk 2 illustrated in FIG. 10 is deleted, the disk volume 1 is connected to the server 1. Supposing that the server virtualization facility 2 is selected to execute the deletion of the virtual disk 2, the physical server is the server 2 operating the server virtualization facility 2. Referring to the physical server administration table 104, it can be seen that the disk volume 1 is not connected to the server 2. Such a case, where the virtual disk in a disk volume recognized (or connected to) by the physical server is deleted, is described later. However, the process physical server identifier (1007 in FIG. 10) stores the server 2 operating the selected server virtualization facility 2.

At this point, the columns of the logic block number 1003, division file name 1005 and status 1006 are blank.

The virtual disk deletion unit 208 sequentially acquires physical block numbers allocated to virtual disks from the use area list 501 in the disk volume where virtual disks to be deleted exist and stores them in the deletion administration table 107 (S1620). The virtual disk deletion unit 208 renews the use area list 501 (S1625). Specifically, the virtual disk identifier 1006 of the virtual disk to be deleted is deleted from the use area list 501 and the logic block number 1102 and the physical block number 1103 are left. This is because the area where information is completely erased can be excluded from the use area list 501 in units of division area, instead of in units of physical disk.

The virtual disk deletion unit 208 again determines the CPU utilization rate determined at the S1600 (this is because the utilization rate may vary with time) and determines the number of blocks in which information is erased based on the CPU utilization rate and free area (rate of an unused physical block) (S1630). For example, the number of blocks is determined based on a matrix of the number of blocks which consists of the CPU utilization rate and the number of unused physical blocks registered in the unused area list 502 as illustrated in FIG. 28. One axis of the matrix of the number of blocks illustrated in FIG. 28 is the CPU utilization rate. For example, if the CPU utilization rate is 20% or less, the number of blocks is taken to be 10 and the number of blocks to be erased is decreased by one (1) as the CPU utilization rate is incremented by 20%. For the other axis, if the CPU utilization rate is 20% or less, the number of blocks is taken to be 10, the number of blocks is decreased by one (1) as the rate is incremented by 20% according to the ratio of the number of the unused physical blocks to the total capacity of the disk volume 114. The number of blocks obtained from the two-axis matrix is selected as the number of blocks to be erased.

The following describes a concept for the matrix of the number of blocks illustrated in FIG. 28. The lower the CPU utilization rate or the fewer the number of the unused physical blocks (or its ratio), the more the block count to be erased. Even if the number of blocks to be erased is great, the CPU utilization rate is low, so that the load less influences the entire system to increase the number of the unused physical blocks, enabling proving degree of freedom for allocating the virtual disk. On the other hand, if the number of the unused physical blocks is great to afford for a virtual disk allocation and the CPU utilization rate is high, the number of the blocks to be erased is decreased to suppress the influence of a load on the entire system. This allows realizing the deletion of virtual disks and the erasure of information in the virtual disks in consideration of two viewpoints of a load as the entire system and availability in the disk volume 114. Although the maximum number of blocks is taken as 10 in FIG. 28, the maximum number of blocks may be changed depending on the capacity of the disk volume 114 and the processing performances of a CPU for each physical server 112. If the performance of a CPU is high, the maximum number of the blocks is decreased, or if the capacity of the disk volume 114 is large, the maximum number of the blocks is increased. Thus, attention is focused on absolute values of performance and capacity instead of on CPU utilization rate to provide the matrix of the number of blocks.

The virtual disk deletion unit 208 registers division files correspondingly with the number of physical blocks determined at the S1630 in the column of division file name 1105 in the deletion administration table 107 (S1635). The virtual disk deletion unit 208 shift process to the work load control unit 210 (S1640). The work load control unit 210, described in detail later, dynamically adjusts the work load in disk erasure process according the current load using the work load administration table 106. The virtual disk deletion unit 208 confirms the CPU allocation from the work load control unit 210 (S1645). The work load control unit 210 notifies the server virtualization facility 110 selected to erase the virtual disk of the CPU allocation, so that the server virtualization facility 110 controls the following disk erasure process within the CPU allocation.

The virtual disk deletion unit 208 changes the status 1006 corresponding to the division file name registered at the S1635 in the deletion administration table 107 to "under execution" (S1650) and shifts process to the disk erasure unit 304 in the selected server virtualization facility 110 (S1655). When the virtual disk deletion unit 208 shifts process to the disk erasure unit 304, the virtual disk deletion unit 208 delivers the physical block number of the division file being a target for erasing information in the virtual disk and the disk volume identifier to which the virtual disk is allocated (if required, information indicating the address of the disk volume 114) as parameters to the disk erasure unit 304.

The virtual disk deletion unit 208 confirms the completion of process in the disk erasure unit 304 (S1660), stores the physical block number of the division file which has completed the erasure process in the unused area list 502 in the disk volume 114 to delete it from the use area list 501 (S1665). The virtual disk deletion unit 208 changes the status 1006 of the erased division file in the deletion administration table 107 to "the completion of erasure" (S1670).

The virtual disk deletion unit 208 determines whether a virtual disk area to be erased has been completely erased (S1675). If the physical disk area has been completely erased, the process returns to S1630 to repeat the processes of the registration of division files and the erasure of their contents until the physical disk area is completely deleted.

If the physical disk area to be erased has completely erased, the virtual disk deletion unit 208 notifies the resource release administrative unit 207 of the completion of erasure.

In the present embodiment, although the erasure process 304 is provided in the server virtualization facility 110, the virtual server 109 for erasing information in the virtual disk may be generated instead to use it for erasure. This method is properly selected in consideration of system structure, complications in control and the size of processing overhead.

In the present embodiment, although the number of blocks is adjusted by registering division files and the work load is adjusted to erase information in units of division file so as to adjust the time for erasing information stored in the physical disk area, a main issue of erasing information in units of division file can be solved even if both adjustments are not performed. Performing any one of the adjustments can solve a collateral issue of decreasing degradation of performance of other virtual servers at the time of erasure of information.

Those skilled in the art will readily appreciate that plural the virtual disk deletion units 208 is simultaneously provided and the virtual disk complete deletion units 208 is programmed to make it reentrant in order that the virtual disk complete deletion unit 208 simultaneously performs the deletion of plural the virtual disks 401 and the erasure of information therein.

In the present embodiment, the process for determining the number of blocks at the S1630 is repeated in units of division file, enabling coping with a dynamic change in the ratio of the number of unused physical blocks and the CPU utilization rate.

Figure 18:
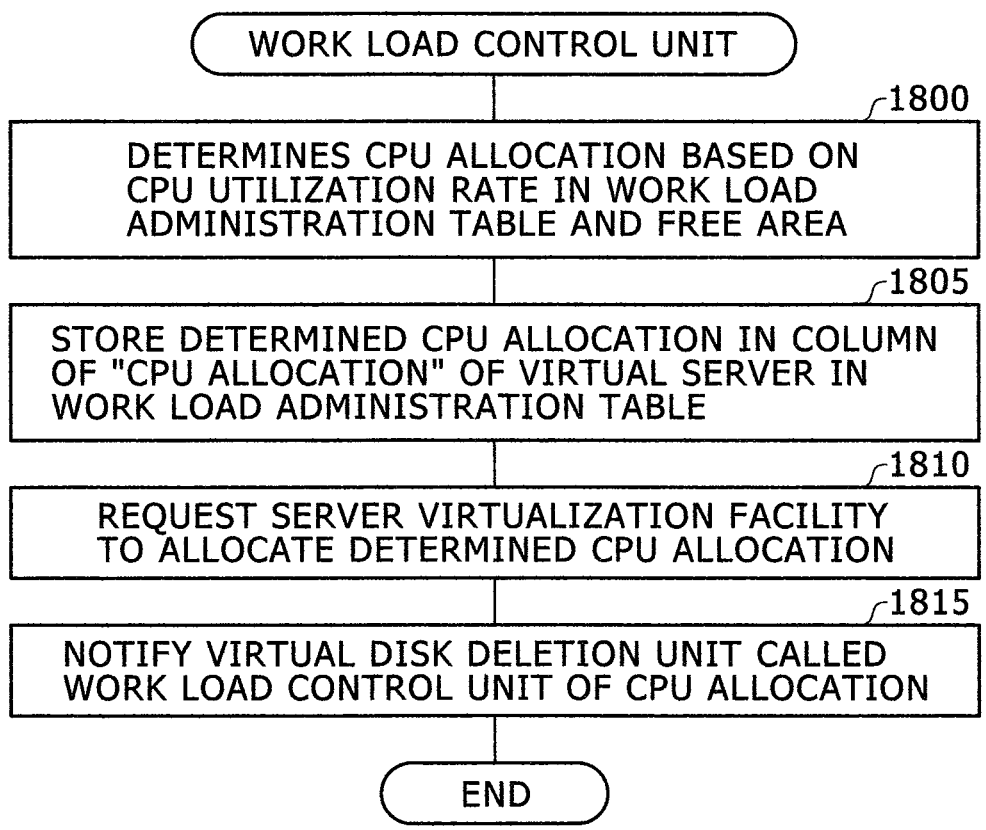
FIG. 18 is a flow chart of the work load control unit.

FIG. 18 is a process flow of the work load control unit 210. The process for setting a work load related to an erasure process 304 of information in a virtual disk is described here. As described in the work load administration table 106 illustrated in FIG. 9, the work load is also set in the virtual server 109. The work load is set in the virtual server 109 based on required performances such as the response time of application programs executed on the virtual server. The work load set in the virtual server 109 at the time of setting the work load related to the erasure process 304 can be treated as given conditions. Although the given conditions dynamically change, the present embodiment can cope with the dynamical change as described above.

The work load control unit 210 determines a CPU allocation or a work load based upon the CPU utilization rate (S1800). The work load control unit 210 determines the CPU allocation in consideration of the work load already allocated to the virtual server and the load of the server virtualization facility 110 within the process performances of the physical server 112. The server virtualization facility 110 which is low in load has been selected to generally afford to set a work load to the erasure process 304.

The following is a description of a method of determining a CPU allocation from the CPU utilization rate used in the S1600 and the ratio of a free area (unused area) to the number of blocks in the entire volume of the number of unused physical blocks. FIG. 29 is an example of a CPU allocation matrix for that purpose. One axis of the CPU allocation matrix is the CPU utilization rate. For example, if the CPU utilization rate is 20% or less, the CPU allocation is taken to be 10, the CPU allocation is decreased by one (1) as the CPU utilization rate is incremented by 20%. For the other axis, the CPU allocation is decreased by one (1) as the ratio of capacity of the number of unused physical blocks to the total capacity of the disk volume 114 is incremented by 20% with the CPU allocation taken as 10 at the ratio of 20% or less. The CPU allocation obtained from the matrix is selected.

Incidentally, the lower the CPU utilization rate or the fewer the number of the unused physical blocks, the more the CPU allocation. A large amount of CPU allocation shortens the time of erasing information in the virtual disk. A small amount of CPU allocation lengthens the time of erasing information in the virtual disk to enable decreasing a load borne on the system. For this reason, if the CPU utilization rate is low, the load borne on the system is small, so that the CPU allocation is increased to allow securing a space area in a short time. On the other hand, if a space area in the disk volume 114 is small, a new virtual server may not be generated, so that the CPU allocation is increased to avoid this to secure a space area in a short time.

As described above, the adjustment of the CPU allocation allows realizing the deletion of virtual disks and the erasure of information in the virtual disks in consideration of two viewpoints of a load as the entire system and availability in the disk volume 114.

Incidentally, although the maximum CPU allocation is taken as 10 in FIG. 29, the maximum CPU allocation may be changed depending on the capacity of the disk volume 114 and the processing performances of a CPU for each physical server 112. If the performance of a CPU is high, the maximum CPU utilization rate is decreased, or if the capacity of the disk volume 114 is large, the maximum CPU allocation is increased. Thus, attention is focused on absolute values of performance and capacity instead of on CPU utilization rate to provide a CPU allocation matrix.

The CPU allocation matrix may be provided for each physical server 112 to hold plural CPU allocation matrixes as the entire system. The CPU allocation may be determined from the CPU allocation matrix (FIG. 29) and the CPU allocation may be adjusted depending on situations. For instance, the space of the physical CPU utilization rate is determined for each virtual server identifier 901 or physical server identifier 902 in the work load administration table 106, and if the value obtained from the CPU allocation matrix exceeds the space of the physical CPU utilization rate, the space of the physical CPU utilization rate may be taken to be CPU allocation which is allocated to the erasure process of a disk.

The work load control unit 210 stores the determined CPU allocation in the CPU allocation correspondingly with the disk erasure in the work load administration table 106 (S1805) and requests the appropriate server virtualization facility 110 to allocate the determined CPU allocation (S1810). The work load control unit 210 notifies the virtual disk deletion unit 208 which has called the work load control unit 210 of the determined CPU allocation.

Figure 19:
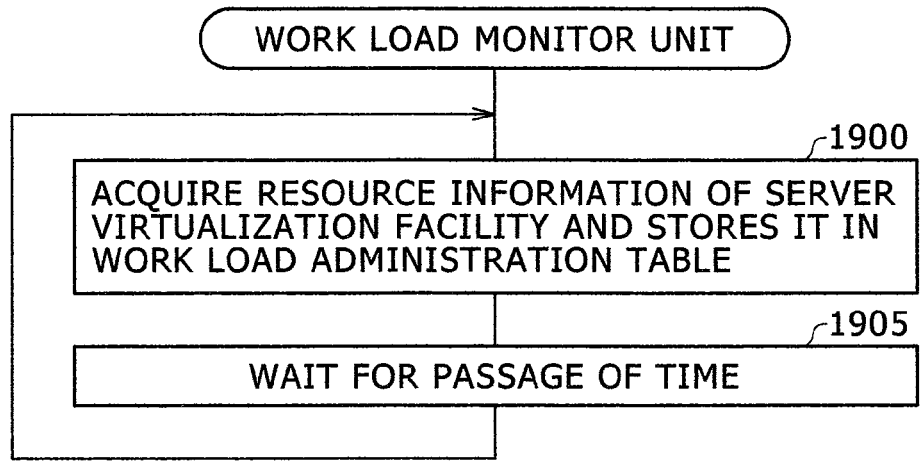
FIG. 19 is a flow chart of the work load monitor unit.

FIG. 19 is a process flow of the work load monitor unit 211. The work load monitor unit 211 acquires resource information in the server virtualization facilities 110 and stores it in the work load administration table 106 (S1900). The work load monitor unit 211 generally monitors the load of the physical servers and the server virtualization facilities and status of failure generation. In the present embodiment, however, the work load monitor unit 211 at least monitors the physical CPU utilization rate of the virtual servers and stores monitor results in the work load administration table 106. As described above, the physical CPU utilization rate is used for allocating a CPU to the process for erasing information in the virtual disk and for setting the division file for the process for erasing it. The work load monitor unit 211 waits for the passage of time to repeat the process at the S1900 every predetermined time (S1905). Although the process flow is illustrated which uses a "WAIT timer" capable of changing a predetermined time interval on a case-by-case basis to wait for the elapse of the predetermined time, there may be started with a periodic timer with a predetermined time interval. If the physical CPU utilization rate varies significantly, the predetermined time interval is shortened to enable accurately monitoring of the status.

Figure 20:
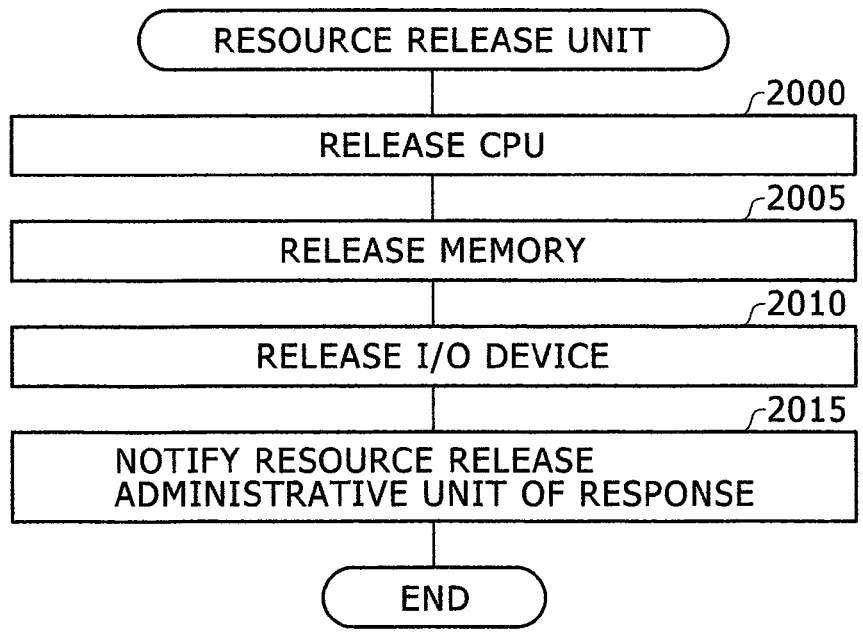
FIG. 20 is a flow chart of the resource release unit.

FIG. 20 is a process flow of the resource release unit 302. The resource release unit 302 releases resources requested by the resource release administrative unit 207. The resource release unit 302 releases a CPU (S2000), a memory (S2005) and an I/O device (S2010) in response to the request from the resource release administrative unit 207. The process flow in FIG. 20 is simplified. At the time of releasing a memory, for example, the resource release unit 302 releases the memory in response to specification as to whether the memory needs releasing or not. If the memory needs releasing, the resource release unit 302 receives specification as to a memory address and then releases the memory. Finally, the resource release unit 302 notifies the resource release administrative unit 207 that the release of resources has been completed in response to the request (S2015).

Figure 21:
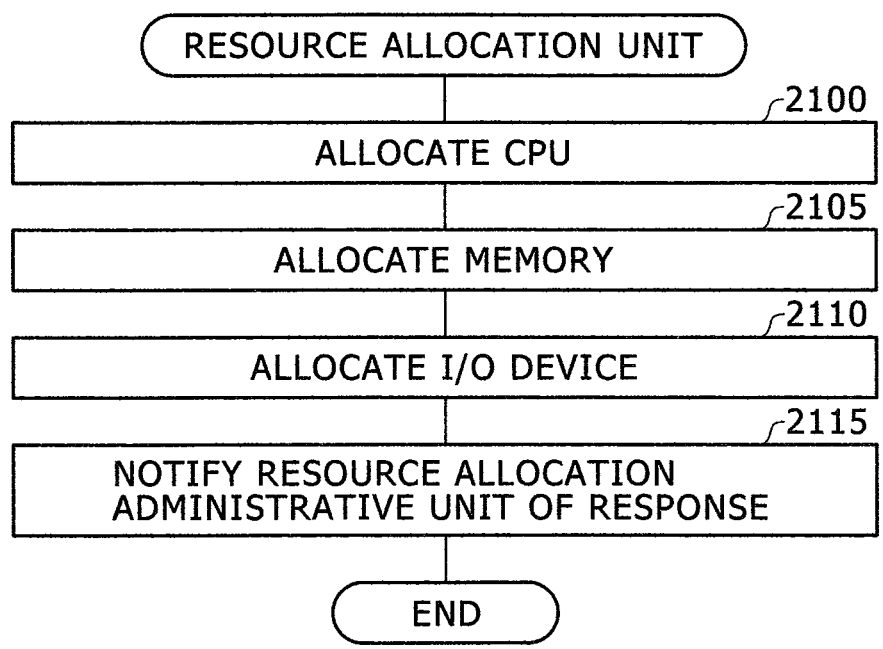
FIG. 21 is a flow chart of the resource allocation unit.

FIG. 21 is a process flow of the resource allocation unit 303. The resource allocation unit 303 allocates resources requested by the resource allocation administrative unit 206 to the virtual server specified by the resource allocation administrative unit 206. The resource allocation unit 303 allocates a CPU (S2100), a memory (S2105) and an I/O device (S2110) in response to the request from the resource allocation administrative unit 206. The process flow in FIG. 21 is simplified. At the time of allocating a memory, for example, the resource allocation unit 303 allocates the memory in response to specification as to whether the memory needs allocating or not. If the memory needs allocating, the resource allocation unit 303 receives specification as to a memory capacity and then allocates the memory. Finally, the resource allocation unit 303 notifies the resource allocation administrative unit 206 that the allocation of resources has been completed in response to the request. At the time of the notification, the resource allocation unit 303 notifies the resource allocation administrative unit 206 of the allocated memory address as well (S2115).

Figure 22:
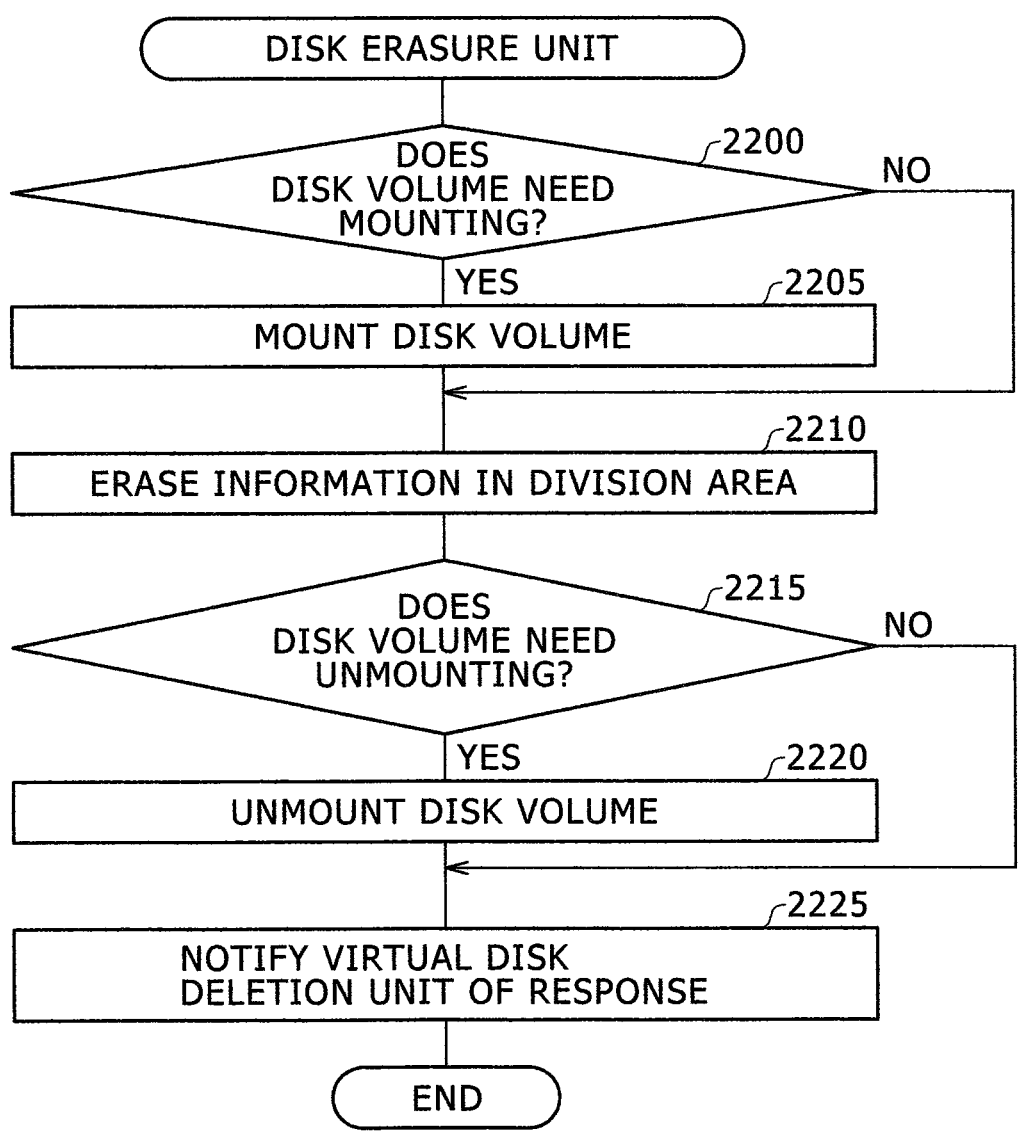
FIG. 22 is a flow chart of the disk erasure unit.

FIG. 22 is a process flow of the disk erasure unit 304. The disk erasure unit 304 erases information stored in the area requested by the virtual disk deletion unit 208. Information (programs or data) in the area is erased by writing random values generated by random numbers, bit zero (0), bit one (1), or Null data in a specified area several times. Data to be written may be unambiguously determined or data which is unlikely to appear in the application used in the area may be used. Data is written in the same area several times to eliminate errors in writing. The more the number of writings, the more substantially the load of the disk erasure unit 304 influences the entire system, so that work load needs adjusting along with the erasure of information, as already described above.

The virtual disk deletion unit 208 delivers the physical block number of the division file being a target for erasing information in the virtual disk and the disk volume identifier to which the virtual disk is allocated (if required, information indicating the address of the disk volume 114) as parameters to the disk erasure unit 304. A determination is made as to whether the disk erasure unit 304 can recognize the disk volume from the delivered disk volume identifier (S2200). If the disk volume cannot be recognized, the disk volume is mounted to enable recognizing it (S2205). The disk erasure unit 304 is executed on the server virtualization facility 110 mounted on the physical server 112. For this reason, this information used for check is aggregated in the physical server administration table 104. For example, it is the disk volume 1 that the physical server 112 of the server 1 can recognize, which means that the physical server 112 itself holds as information inherent in the server 1.

The disk erasure unit 304 erases information in the division file requested by the virtual disk deletion unit 208 (S2210). As describe above, the division file is given by the block number of the disk volume, so that information stored for each area specified by the block number is erased. If the information in the division file is completely erased, a check is made whether the disk volume needs unmounting (S2215) and if required, the disk volume is unmounted (S2220). For the necessity of unmounting, if it is determined that the disk volume needs mounting at the S2200, the disk volume also needs unmounting. On the other hand, if it is determined that the disk volume does not need mounting at the S2200, the disk volume does not need unmounting either. Thus, the disk volume which cannot be recognized by the physical server 112 and the server virtualization facility 110 which execute the process of the disk erasure unit 304 is temporally recognized while the process for erasing information in the division file is being executed. Finally, the disk erasure unit 304 notifies the virtual disk deletion unit 208 that the information in the requested division file has been completely erased. Thus, information in the virtual disk is erased along with the deletion of the virtual server, so that, even if a virtual disk area is allocated to a new virtual server as a virtual disk, originally stored information cannot be read from the new virtual server.

In the present embodiment, since information in the virtual disk 401 is erased along with the deletion of the virtual server 109, information in the used virtual disk 401 cannot be read by the third party. Incidentally, in the present embodiment, although an object of which information is erased is taken to be the virtual disk 401, those skilled in the art will readily appreciate that the technique and its concept in the present embodiment can be applied to a memory of a virtualized server.

Second Embodiment

Figure 23:
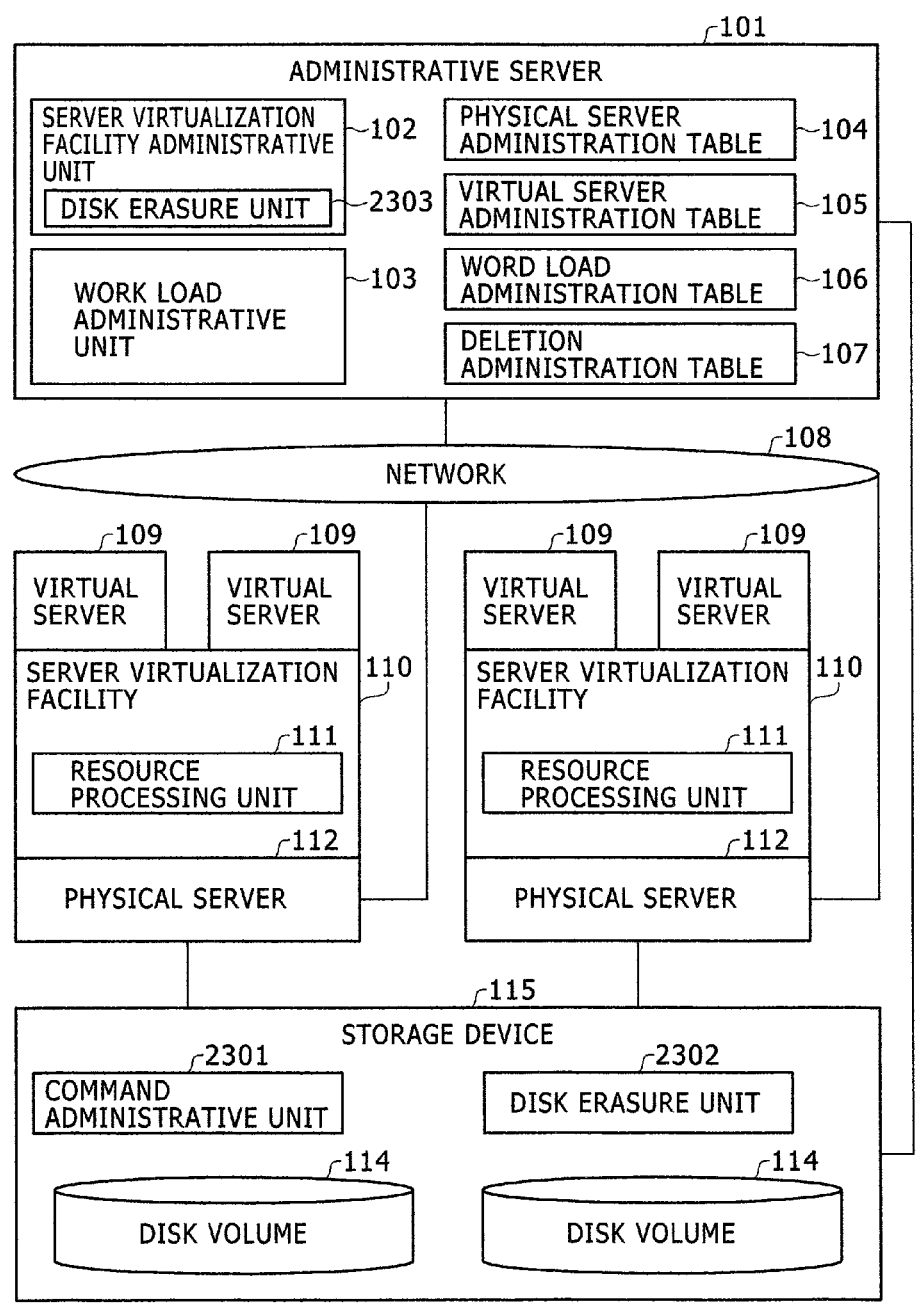
FIG. 23 is a general schematic diagram in a second embodiment.

FIG. 23 illustrates a total schematic view in the second embodiment. In the second embodiment, the same components as in the first embodiment are designated by the same reference numerals and characters, and duplicated description is omitted as much as possible. In the second embodiment, information in the virtual disk is erased by the storage device (disk unit) 115. The storage device 115 includes a command administrative unit 2301 and a disk erasure unit 2302. The disk erasure unit 2302 writes, for example, random numerals in the same area several times as is the case with the first embodiment. The command administrative unit 2301 controls the priority of erasure of disks. The storage device 115 receives a disk erasure command issued by a virtual disk deletion unit 2303 on the administrative server 101 and erases information in the disk according to priority specified by the administrative server 101.

Figure 24:
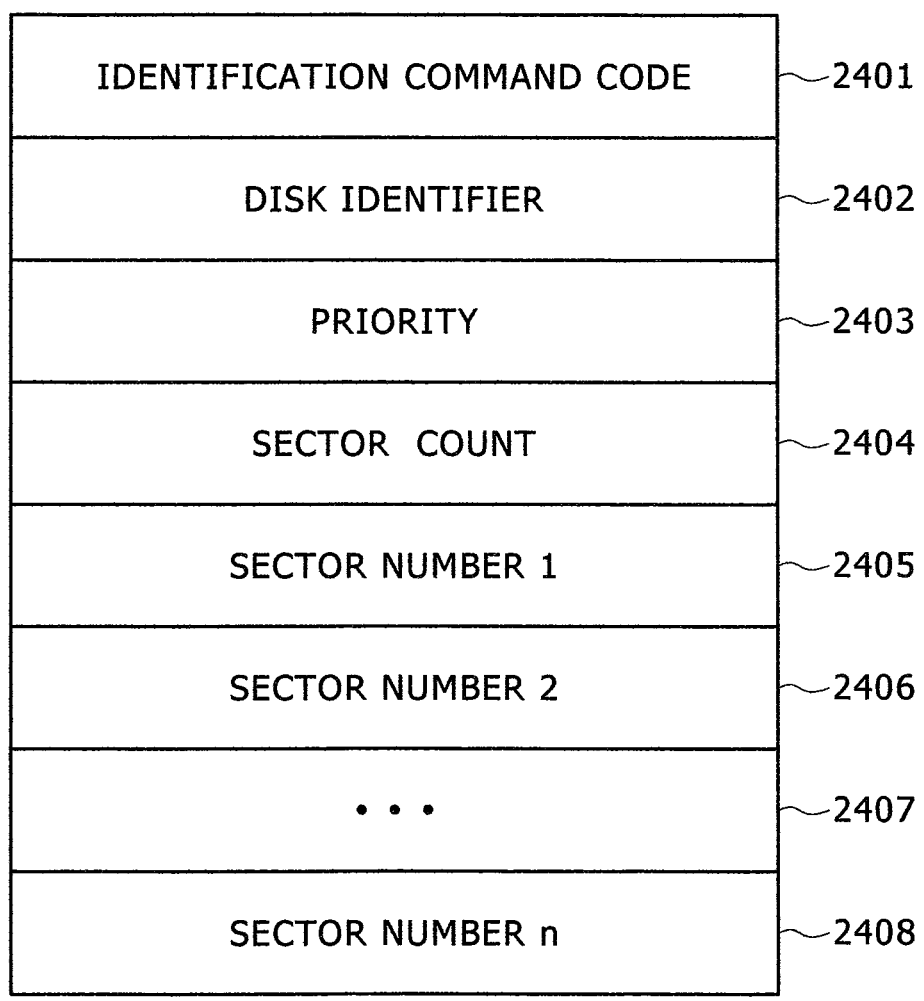
FIG. 24 is a table illustrating the format of the disk erasure commands.

FIG. 24 is a table illustrating the disk erasure commands issued by the virtual disk deletion unit 2303 to the storage device 115. Reference numeral 2401 stores codes for disk erasure commands. Reference numeral 2402 stores the disk identifiers to be erased. Reference numeral 2403 stores the priority of erasure of disks. Reference numeral 2404 stores the number of sectors whose disks are erased. Reference numerals 2405 to 2408 store sector numbers corresponding to the number of sectors shown in the reference numeral 2404 as a list. The erasure of a disk in a discontinuous area due to the list structure of a sector number is executed by one command.

Figure 25:
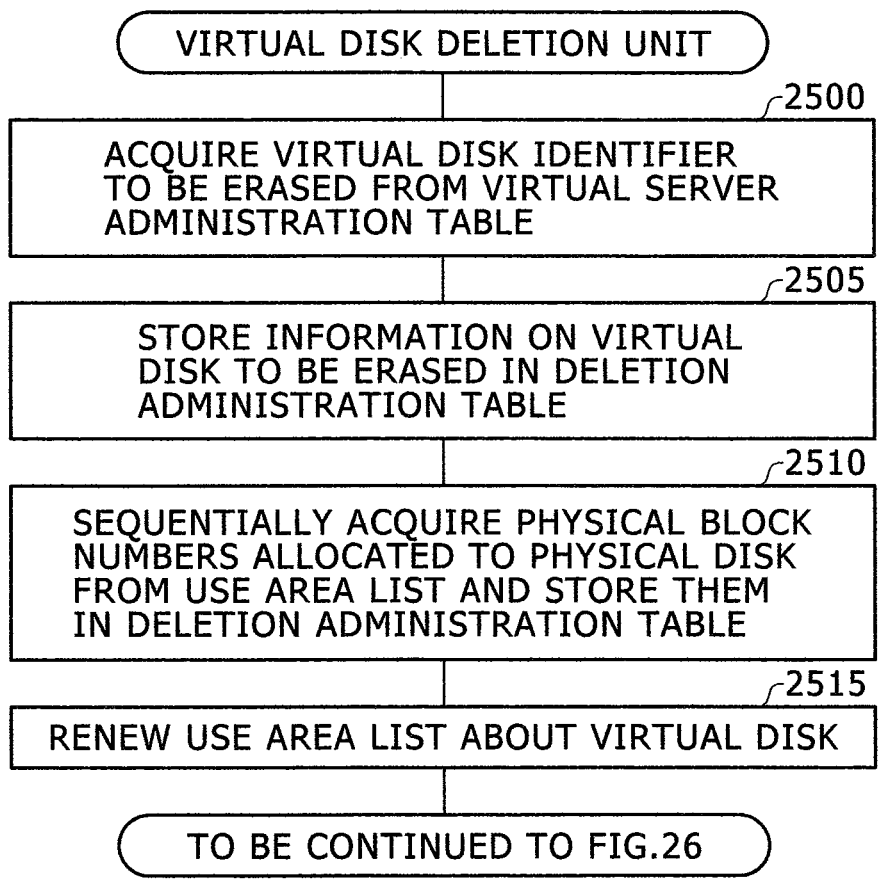
FIG. 25 is the first half of a flow chart illustrating the virtual disk deletion unit in the second embodiment.
Figure 26:
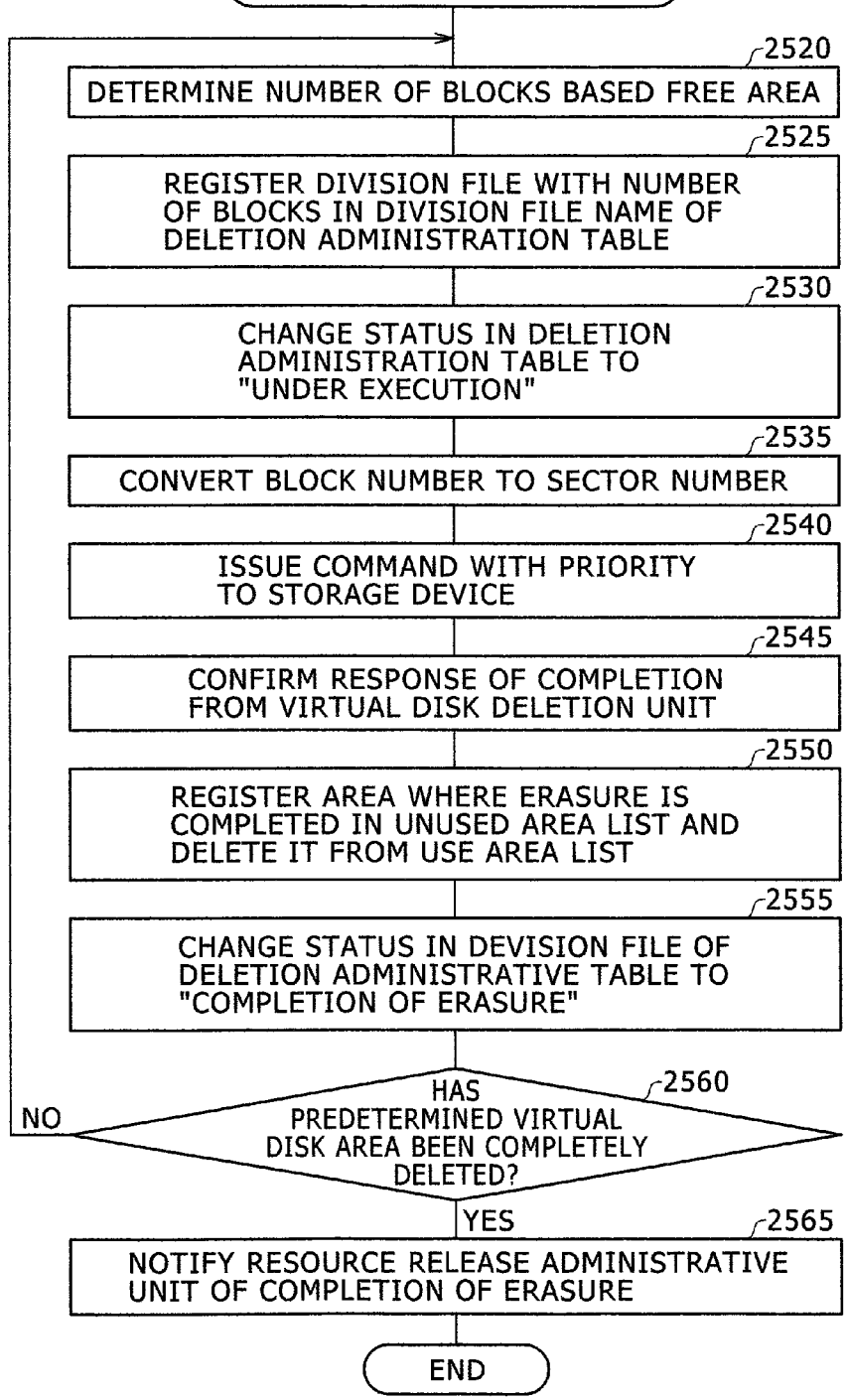
FIG. 26 is the second half of a flow chart illustrating the virtual disk deletion unit in the second embodiment.

FIGS. 25 and 26 are a process flow of the virtual disk deletion unit 2303 in the second embodiment. The virtual disk deletion unit 2303 acquires a virtual disk identifier to be erased from the virtual server administration table 105 (S2500). The virtual disk deletion unit 2303 stores information on the virtual disk to be erased in the deletion administration table 107 (S2505).

Information stored in the deletion administration table 107 by the virtual disk deletion unit 2303 includes the acquired virtual disk identifier, the disk volume identifier of a connection disk obtained from the physical server administration table 104 and the virtual server administration table 105 based on the virtual disk identifier, logic block numbers of the virtual disks indicated by the virtual disk identifier obtained with reference to the use list 501 of the disk volume indicated by the disk volume identifier and a process physical server identifier. The virtual disk deletion unit 2303 sequentially acquires physical block numbers allocated to the physical disk from the using area list 501 of the disk volume where the virtual disk to be deleted exists and stores them in the deletion administration table 107 (S2510). The virtual disk deletion unit 2303 renews the use area list 501 (S2515). The renewal of the use area list 501 is the same as in the first embodiment.

The virtual disk deletion unit 2303 determines the number of blocks based on the free area (S2520) and registers the division file corresponding to the determined number of blocks in the deletion administration table 107 (S2525). For example, the virtual disk deletion unit 2303 determines the number of blocks according to the ratio of the number of unused physical blocks to the total capacity of the disk volume 114. How to determine the number of blocks or the concept of the number of blocks (division file) are the same in the first embodiment. The virtual disk deletion unit 2303 changes the status 1006 in the deletion administration table 107 to "under execution" (S2530).

The virtual disk deletion unit 2303 converts the physical block number to a sector number being an input and an output unit of the storage device 115 (S2535). The step S2535 is required if the administrative unit of the virtual disk 401 is different from the size of sector in the storage device 115. For example, if the size of the block is 1024 bytes and the size of the sector is 512 bytes, one block includes two sectors, so that two sector numbers are calculated from one block number to determine a sector number to be erased.

The virtual disk deletion unit 2303 issues commands to the storage device 115 in the format shown in FIG. 24 (S2540). Priority is changed according to the ratio of space area in the disk volume 114. As one example of priority, the priority in the case where the ratio of space area in the disk volume 114 is small is taken to be zero (0), a value expressing priority is increased as the ratio of space area is increased. The priority means that information is erased in a predetermined disk area with a smaller load borne on the storage device 115 as its value becomes larger. The execution of erasure of information in the predetermined area according to priority is described later.

The following steps S2545 to S2565 in the virtual disk deletion unit 2303 are the same as those in the first embodiment (the steps S1660 to S1680 in FIG. 17), so that description thereof is omitted.

Figure 27:
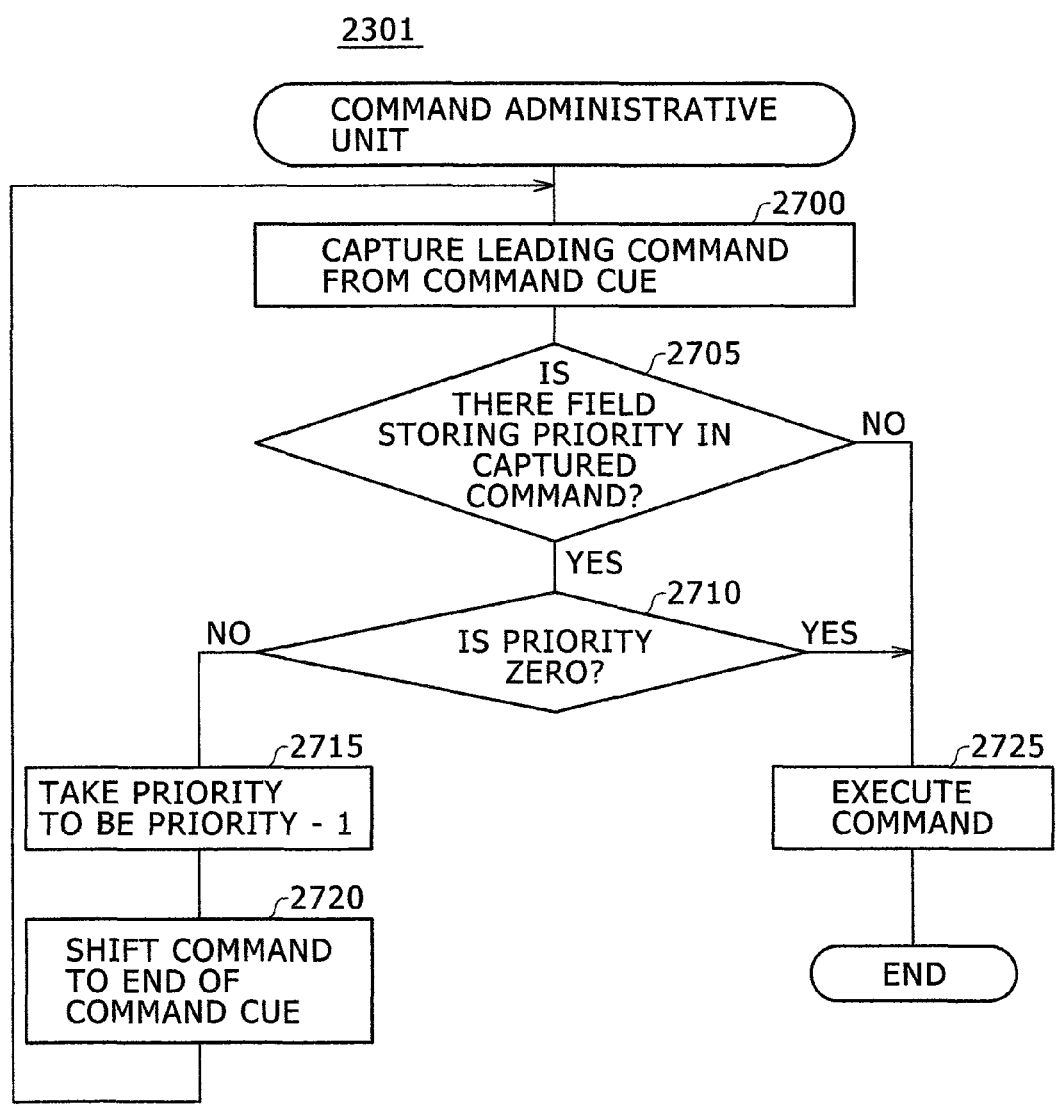
FIG. 27 is a flow chart of the command administrative unit.

FIG. 27 is a process flow of a command administrative unit 2501 in the storage device 115. The command administrative unit 2501 captures a leading command from a command cue (S2700). The command cue is one in which an unexecuted command received by the storage device 115 from the outside is stored. The command administrative unit 2501 determines whether there is a field storing priority in the captured command (S2705). If there is a priority field, a determination is made whether priority is zero (0) (S2710).

If there is no priority field and priority is zero (0), the command captured from the command cue is executed (S2725). If priority is not zero (0), the value of priority is taken to be minus one (−1) (S2715), the command is shifted to the end of the command cue (S2720). The process of the step S2725 shifts the command of disk erasure issued from the virtual disk deletion unit 2303 to the disk erasure unit 2302 and executes it. The detailed process of the disk erasure unit 2302 is omitted here. The commands given in the format in FIG. 24 are executed by simply writing a predetermined value in sectors in sector number to erase information stored already.

The process of the command administrative unit 2501 makes the process of prioritized request for disk erasure lower than other commands to enable controlling the load of the storage device 115. This is because a command to which a large value set as priority is issued if the ratio of the space capacity of the disk volume is large, as described above.

In the present embodiment, although the command cue is operated to adjust the priority of the disk erasure process, the load of the storage device 115 may be taken into consideration at the time of operating the command cue. For example, if the load of the storage device 115 is higher than a predetermined value, priority is not subtracted at the time of shifting the command cue to end of the command cue or the command cue is less frequently seen, thereby realizing the operation of the command cue in consideration of the load of the storage device 115.

What is claimed is:

1. A server system comprising:
 a storage device including a plurality of disk volumes, a region of each of the disk volumes being allocated as a virtual disk; and
 at least one server device, each of which includes a plurality of virtual servers, each of which executes processing by using one of the allocated virtual disks,
 wherein the virtual disk used by a virtual server is divided into a plurality of logical blocks, and each of the logical blocks corresponds to a physical block,
 wherein each of the at least one server device comprises:
  a storing unit for storing information showing an erasing condition for each of the physical blocks;
  a specifying part for, after deleting a first virtual server among the virtual servers, specifying information for identifying the physical block of the virtual disk allocated to the first virtual server;
  an erasing part for erasing an erasing target physical block among the disk volumes based on the information identifying the specified physical block; and
  a usage part for using, by a second virtual server, the physical block allocated to the first virtual server, after completion of the erasing process of the physical block of the virtual disk allocated to the first virtual server among the virtual servers; and
 wherein when the server device does not recognize the disk volume to which the virtual disk for erasing the physical block is not allocated, making the server device to temporarily recognize the volume at a time of erasing of the physical block.

2. The server system according to claim 1,
 wherein a number of the physical blocks is decreased when a load of the server device increases.

3. The server system according to claim 1,
 wherein an amount to be divided for the virtual disk is increased when an amount of the disk volume which is not allocated as the virtual disk decreases.

4. A method for controlling a virtual server in a server system, the server system comprising a storage device including a plurality of disk volumes, a region of each of the disk volumes being allocated as a virtual disk; and at least one server device, each of which includes a plurality of virtual servers, each of which executes processing by using one of the allocated virtual disks; wherein the virtual disk used by the virtual server is divided into a plurality of logical blocks, and each of the logical blocks corresponds to a physical block; the method being executed by the server device and comprising:
 storing information showing an erasing condition for each of the physical blocks;
 after deleting a first virtual server among the virtual servers, specifying information for identifying the physical block of the virtual disk allocated to the first virtual server;
 erasing an erasing target physical block among the disk volumes based on the information identifying the specified physical block;
 using, by a second virtual server, the physical block allocated to the first virtual server, after completion of the erasing process of the physical block of the virtual disk allocated to the first virtual server among the virtual servers; and
 wherein when the server device does not recognize the disk volume to which the virtual disk for erasing the physical block is not allocated, making the server device to temporarily recognize the volume at a time of erasing of the physical block.

5. The method according to claim 4,
 wherein a number of the physical blocks is decreased when load of the server device increases.

6. The method according to claim 4,
 wherein amount to be divided for the virtual disk is increased when amount of the disk volume which is not allocated as the virtual disk becomes smaller.

7. A non-transitory computer readable storage medium storing a program for executing a method for controlling a virtual server in a server system, the server system comprising a storage device including a plurality of disk volumes, a region of each of the disk volumes being allocated as a virtual disk; and at least one server device, each of which includes a plurality of virtual servers, each of which executes processing by using the allocated virtual disks; wherein the virtual disk used by the virtual server is divided into a plurality of logical blocks, and each of the logical blocks corresponds to a physical block; the method executed by the server device and comprising:
 storing information showing an erasing condition for each of the physical blocks;
 after deleting a first virtual server among the virtual servers, specifying information for identifying the physical block of the virtual disk allocated to the first virtual server;
 erasing an erasing target physical block among the disk volumes based on the information identifying the specified physical block; and
 using, by a second virtual server, the physical block allocated to the first virtual server, after completion of the erasing process of the physical block of the virtual disk allocated to the first virtual server among the virtual servers;
 wherein when the server device does not recognize the disk volume to which the virtual disk for erasing the physical block is not allocated, making the server device to temporarily recognize the volume at a time of erasing of the physical block.

* * * * *